(12) United States Patent
Asahi et al.

(10) Patent No.: US 10,829,645 B2
(45) Date of Patent: Nov. 10, 2020

(54) METHOD OF MANUFACTURING ANTIREFLECTION FILM, ANTIREFLECTION FILM, POLARIZING PLATE, COVER GLASS, AND IMAGE DISPLAY DEVICE

(71) Applicant: FUJIFILM Corporation, Tokyo (JP)

(72) Inventors: Miho Asahi, Kanagawa (JP); Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 237 days.

(21) Appl. No.: 16/150,768

(22) Filed: Oct. 3, 2018

(65) Prior Publication Data

US 2019/0031890 A1 Jan. 31, 2019

Related U.S. Application Data

(63) Continuation of application No. PCT/JP2017/013110, filed on Mar. 29, 2017.

(30) Foreign Application Priority Data

Apr. 4, 2016 (JP) .................................. 2016-075466

(51) Int. Cl.
*G02B 1/10* (2015.01)
*C09D 5/00* (2006.01)
(Continued)

(52) U.S. Cl.
CPC .............. *C09D 5/006* (2013.01); *B05D 5/06* (2013.01); *B32B 7/02* (2013.01); *G02B 1/115* (2013.01);
(Continued)

(58) Field of Classification Search
CPC ... G02B 1/00; G02B 1/04; G02B 1/10; G02B 1/11; G02B 1/111; G02B 1/113;
(Continued)

(56) References Cited

U.S. PATENT DOCUMENTS 7,531,234 B2* 5/2009 Nakamura .............. G02B 1/111
  428/328
8,814,370 B2* 8/2014 Kim ....................... C09D 5/006
  359/601

(Continued)

FOREIGN PATENT DOCUMENTS

JP 2014-525600 A 9/2014
JP 2014-529762 A 11/2014
(Continued)

OTHER PUBLICATIONS

International Search Report issued in PCT/JP2017/013110 dated Jul. 4, 2017.
(Continued)

*Primary Examiner* — Arnel C Lavarias
(74) *Attorney, Agent, or Firm* — Edwards Neils LLC; Jean C. Edwards, Esq.

(57) ABSTRACT

A method of manufacturing an antireflection film including, in the following order, a substrate, a hard coat layer and an antireflection layer as defined herein includes: applying a hard coat layer forming composition including a crosslinking compound having a weight-average molecular weight equal to or greater than 600, a compound having a molecular weight smaller than 600 and having a photopolymerizable group and a photopolymerization initiator, onto the substrate as defined herein; semi-curing the hard coat layer forming film; applying an antireflection layer forming composition including particles, a binder resin forming compound and a solvent, onto the semi-cured hard coat layer forming film as defined herein; causing a part of the binder resin forming compound to permeate the hard coat layer forming film as defined herein; and completely curing the hard coat layer forming film and the antireflection layer forming film as defined herein.

4 Claims, 2 Drawing Sheets

(51) Int. Cl.
    *B32B 7/02* (2019.01)
    *G02B 1/118* (2015.01)
    *B05D 5/06* (2006.01)
    *G02B 1/115* (2015.01)
    *G02B 1/14* (2015.01)
    *G02B 5/30* (2006.01)

(52) U.S. Cl.
    CPC ............. *G02B 1/118* (2013.01); *G02B 1/14* (2015.01); *G02B 5/3033* (2013.01)

(58) Field of Classification Search
    CPC .......... G02B 1/115; G02B 1/118; G02B 1/14; G02B 5/20; G02B 5/206; G02B 5/28; G02B 5/285; G02B 5/287; G02B 5/30; G02B 5/3008; G02B 5/3025; G02B 5/3033; G02B 5/3041; G02B 5/305; C09D 5/006; B05D 5/06; B32B 7/02; B32B 7/023
    USPC ....... 359/577, 580, 581, 582, 586, 588, 589, 359/590; 428/98, 156, 206, 221, 323, 428/325, 327, 332, 333, 338
    See application file for complete search history.

(56) References Cited

U.S. PATENT DOCUMENTS

| | | | | |
|---|---|---|---|---|
| 8,877,287 B2* | 11/2014 | Kim | ............ | G02B 1/105 427/180 |
| 10,338,276 B2* | 7/2019 | Asahi | ............ | G02B 1/118 |
| 2007/0047087 A1* | 3/2007 | Fukuda | ............ | G02B 5/0294 359/582 |
| 2009/0075074 A1* | 3/2009 | Horio | ............ | G02B 1/16 428/341 |
| 2013/0215514 A1 | 8/2013 | Kim et al. | | |
| 2013/0216729 A1 | 8/2013 | Kim et al. | | |
| 2013/0216817 A1 | 8/2013 | Kim et al. | | |
| 2013/0216818 A1 | 8/2013 | Kim et al. | | |
| 2013/0216819 A1* | 8/2013 | Kim | ............ | B32B 7/02 428/313.9 |
| 2013/0222915 A1* | 8/2013 | Kim | ............ | B05D 3/067 359/601 |
| 2016/0061997 A1 | 3/2016 | Kamohara et al. | | |
| 2016/0077239 A1 | 3/2016 | Asahi et al. | | |
| 2016/0077240 A1 | 3/2016 | Asahi et al. | | |

FOREIGN PATENT DOCUMENTS

| | | | | |
|---|---|---|---|---|
| JP | 2014-531608 A | | 11/2014 | |
| JP | 2014-240956 A | | 12/2014 | |
| JP | 2017173761 A | * | 9/2017 | ............ G02B 5/30 |
| WO | 2015/152308 A1 | | 10/2015 | |

OTHER PUBLICATIONS

Written Opinion issued in PCT/JP2017/013110 dated Jul. 4, 2017.
International Preliminary Report on Patentability completed by WIPO dated Oct. 9, 2018, in connection with International Patent Application No. PCT/JP2017/013110.
Office Action, issued by the Japanese Patent Office dated Oct. 8, 2019, in connection with Japanese Patent Application No. 2016-075466.

* cited by examiner

METHOD OF MANUFACTURING ANTIREFLECTION FILM, ANTIREFLECTION FILM, POLARIZING PLATE, COVER GLASS, AND IMAGE DISPLAY DEVICE

CROSS REFERENCE TO RELATED APPLICATION

This is a continuation of International Application No. PCT/JP2017/013110 filed on Mar. 29, 2017, which was published under Article 21(2) in Japanese, and which claims priority under 35 U.S.C. § 119(a) from Japanese Patent Application No. 2016-075466 filed on Apr. 4, 2016. The above applications are hereby expressly incorporated by reference, in their entirety, into the present application.

BACKGROUND OF THE INVENTION

1. Field of the Invention

The present invention relates to a method of manufacturing an antireflection film an antireflection film, a polarizing plate, a cover glass, and an image display device.

2. Description of the Related Art

In an image display device such as a display device using a cathode ray tube (CRT), a plasma display panel (PDP), an electroluminescent display (ELD), a vacuum fluorescent display (VFD), a field emission display (FED), and a liquid crystal display (LCD), an antireflection film may be provided in order to prevent decrease in contrast due to reflection of external light on a display surface and reflected glare of an image. In addition to the image display device, the antireflection function may be provided to a glass surface of the showroom or the like by an antireflection film.

As the antireflection film, an antireflection film having a fine uneven shape with a period equal to or less than the wavelength of visible light on the surface of a substrate, that is, an antireflection film having a so-called moth eye structure is known. The moth eye structure makes a refractive index gradient layer in which the refractive index successively changes in a pseudo manner from the air toward the bulk material inside the substrate, and reflection of the light can be prevented.

JP2014-240956A discloses a method of forming an antireflection layer having a moth eye structure, the method including, applying an antireflection layer forming composition including particles having an average primary particle diameter of 50 nm to 700 nm, a binder resin forming polymerizable compound, and a solvent having permeability to a plastic substrate, onto a plastic substrate, causing the binder resin forming polymerizable compound. to permeate the plastic substrate, and performing curing to cause the particles to protrude from a surface.

2014-240956A further discloses that, in a case where a permeation layer can be formed, in a case where the antireflection layer is laminated, the plastic substrate may include a separate resin layer on the surface, for example, a hard coat layer for applying hard coating properties.

SUMMARY OF THE INVENTION

An antireflection film disclosed in JP2014-240956A has excellent antireflection performance and surface uniformity. However, particularly, in recent years, usage environments and usage aspects of the antireflection film are diversified, the inventors have conducted research on the improvement of scratch resistance of a surface of a film as a new object.

That is, an object of the present invention is to provide a method of manufacturing an antireflection film having excellent antireflection performance and excellent scratch resistance, the antireflection film, a polarizing plate including the antireflection film, a cover glass, and an image display device.

In a case of manufacturing an antireflection film having a moth eye structure by a coating method, a method of temporarily burying particles in a layer including a binder resin forming compound (antireflection layer forming film), causing a part of the binder resin forming compound to permeate a substrate to lower an interface between the antireflection layer forming film and air, and causing the particles to protrude has been known, but the following problems are found from the research of the inventors.

(1) In a case of providing a hard coat layer as an underlayer of the antireflection layer, in order to improve scratch resistance of the antireflection film, a density of the hard coat layer increases after completely curing a hard coat layer forming film, and accordingly, it is difficult to cause the binder resin forming compound to permeate the antireflection layer forming film. As a result, the scratch resistance may not be sufficiently improved.

(2) In a case where the hard coat layer forming film is semi-cured to decrease the density thereof, the binder resin forming compound easily permeates the antireflection layer forming film, but a monomer from the hard coat layer forming film is dissolved in the antireflection layer forming film, and accordingly, the interface between the antireflection layer forming film and air is hardly lowered, and an excellent uneven shape cannot be formed.

From the intensive studies, the inventors have found that, the above problems can be solved by including a crosslinking compound having a weight-average molecular weight equal to or greater than 600 in a hard coat layer forming composition.

That is, the above object can be achieved by the following means.

<1> A method of manufacturing an antireflection film comprising, in the following order, a substrate, a hard coat layer and an antireflection layer having an uneven shape on a surface of the antireflection layer which is opposite to an interface of the antireflection layer with the hard coat layer, the method comprising:

applying a hard coat layer forming composition comprising a crosslinking compound having a weight-average molecular weight equal to or greater than 600, a compound having a molecular weight smaller than 600 and having a photopolymerizable group and a photopolymerization initiator, onto the substrate to provide a hard coat layer forming film;

semi-curing the hard coat layer forming film;

applying an antireflection layer forming composition comprising particles, a binder resin forming compound and a solvent, onto the semi-cured hard coat layer forming film, to provide an antireflection layer forming film;

causing a part of the binder resin forming compound to permeate the hard coat layer forming film to cause the particles to protrude from a surface of the antireflection layer forming film which is opposite to an interface of the antireflection layer forming film with the hard coat layer forming film to form the uneven shape; and completely curing the hard coat layer forming film and the antireflection layer forming film to form the hard coat layer and the antireflection layer.

<2> The method of manufacturing an antireflection film according to <1>,

In which the weight-average molecular weight of the crosslinking compound is equal to or smaller than 500,000.

<3> The method of manufacturing an antireflection film according to <1>,

In which a crosslinking group equivalent of the crosslinking compound represented by Expression (1) is equal to or greater than 200.

$$\text{the crosslinking group equivalent of the crosslinking compound} = \text{the weight-average molecular weight of the crosslinking compound/a number of crosslinking groups included in 1 molecule of the crosslinking compound.} \quad \text{Expression (1)}$$

<4> The method of manufacturing an antireflection film according to <1>,

In which the crosslinking group comprised in the crosslinking compound is a (meth)acryloyl group, an epoxy group, or an oxetanyl group.

<5> The method of manufacturing an antireflection film according to <1>,

In which the crosslinking compound is a urethane resin, a (meth)acrylic resin, or an epoxy resin.

<6> The method of manufacturing an antireflection film according to <1,>

In which a mass ratio of the crosslinking compound to the compound having a molecular weight smaller than 600 and having the photopolymerizable group in the hard coat layer forming composition is 5/95 to 95/5.

<7> An antireflection film comprising, in the following order:

a substrate;

a hard coat layer that comprises a compound obtained by a reaction of a crosslinking compound having a weight-average molecular weight equal to or greater than 600 and a compound having a molecular weight smaller than 600 and having a photopolymerizable group; and an antireflection layer having an uneven shape on a surface of the antireflection layer which is opposite to an interface of the antireflection layer with the hard coat layer, In which a ratio B/A, which is a ration of a distance A between peaks of adjacent protrusions of the uneven shape and a distance B between a recessed part of the uneven shape and a center between the peaks of the adjacent protrusions of the uneven shape, is equal to or greater than 0.5, an average of an integrated reflectivity of the antireflection film at a wavelength of 450 to 650 nm is equal to or smaller than 2%, and an amount of a reflectivity change before and after a scratch resistance test, in which a surface of the antireflection layer which is opposite to the interface of the antireflection layer with the hard coat layer is reciprocated five times using a steel wool with a load of 400 g is equal to or smaller than 2.5%.

<8> A polarizing plate comprising:

a polarizer; and at least one protective film that protects the polarizer,

In which at least one of the at least one protective film is the antireflection film according to <7>.

<9> A cover glass comprising:

the antireflection film according to <7> as a protective film.

<10> An image display device comprising:

the antireflection film according to <7>.

According to the present invention, it is possible to provide a method of manufacturing an antireflection film having excellent antireflection performance and excellent scratch resistance, the antireflection film, a polarizing plate including the antireflection film, a cover glass, and an image display device.

EXPLANATION OF REFERENCES

Figure 1:
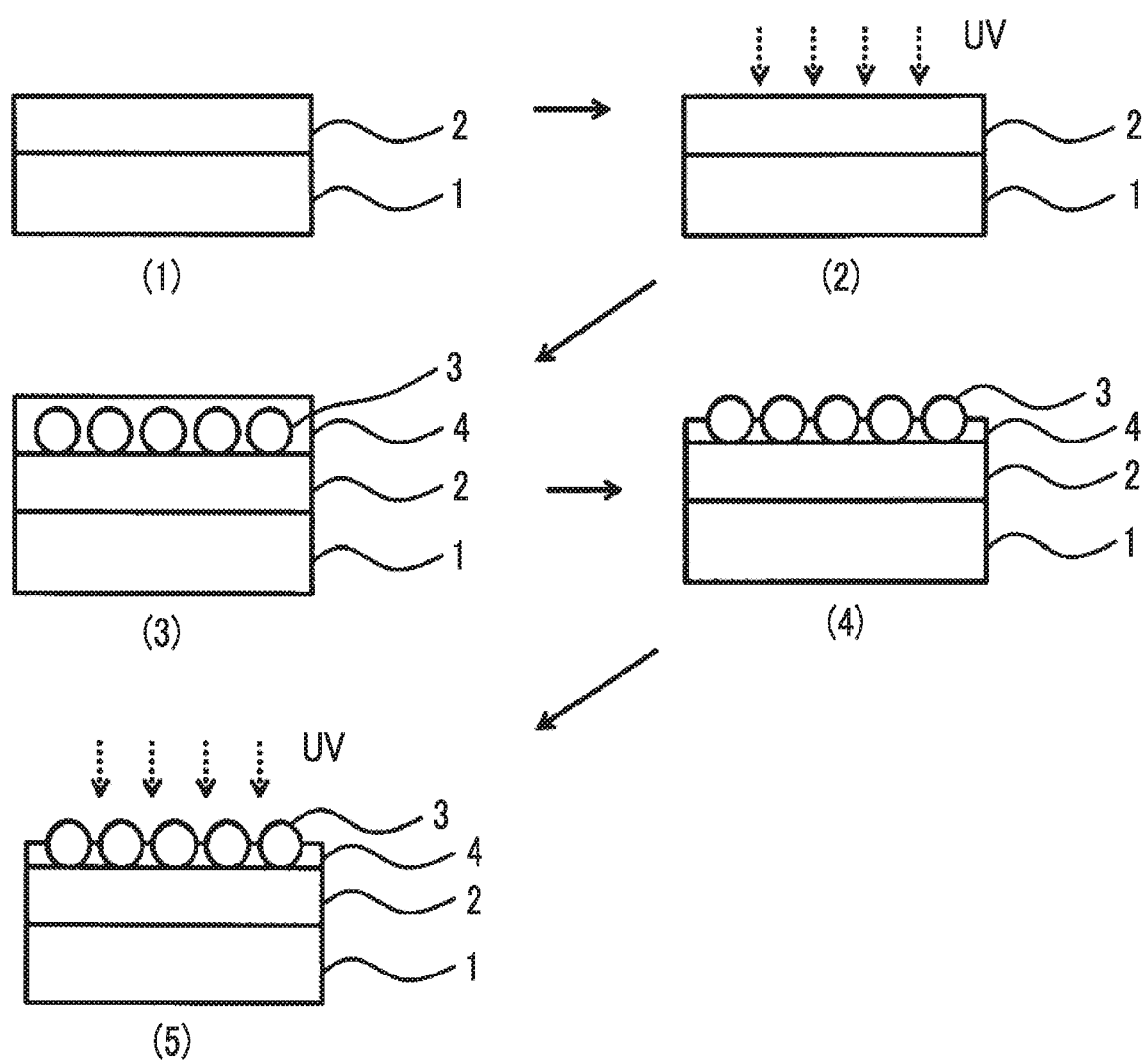
FIG. 1 is a schematic view illustrating an example for describing a method of manufacturing an antireflection film according to the present invention.

1: substrate
2: hard coat layer forming film or hard coat layer
3: particles
4: binder resin forming compound or layer including binder resin
5: antireflection layer
10: antireflection film
A: distance between peaks of adjacent protrusions
B: distance between center between peaks of adjacent protrusions and recessed part

DESCRIPTION OF THE PREFERRED EMBODIMENTS

Hereinafter, preferred embodiments according to the present invention will be described in detail. Constituent elements shown below may be described based on representative embodiments of the present invention, but the present invention is not limited to such embodiments.

In addition, "(meth)acrylate" indicates at least one of acrylate or methacrylate, "(meth)acryl" indicates at least one kind of acryl and methacryl, and "(meth)acryloyl" indicates at least one kind of acryloyl or methacryloyl.

In this specification, in a case where a range of numerical values is shown as "(numerical value 1) to (numerical value 2)", this expression means that a range "equal to or greater than (numerical value 1) and equal to or smaller than (numerical value 2)".

[Method of Manufacturing Antireflection Film]

A method of manufacturing an antireflection film of the present invention is a method of manufacturing an antireflection film including, in the following order, a substrate, a hard coat layer, and an antireflection layer having an uneven shape on a surface of the antireflection layer which is opposite to an interface of the antireflection layer with the hard coat layer, the method including:

a step (1) of applying a hard coat layer forming composition including a crosslinking compound having a weight-average molecular weight equal to or greater than 600, a compound having a molecular weight smaller than 600 and having a photopolymerizable group, and a photopolymerization initiator, onto the substrate to provide a hard coat layer forming film;

a step (2) of semi-curing the hard coat layer forming film;

a step (3) of applying an antireflection layer forming composition including particles, a binder resin forming compound and a solvent, onto the semi-cured hard coat layer forming film, to provide an antireflection layer forming film;

a step (4) of causing a part of the binder resin forming compound to permeate the hard coat layer forming film to cause the particles to protrude from a surface of the antireflection layer forming film which is opposite to an interface of the antireflection layer forming film with the hard coat layer forming film to form the uneven shape; and a step (5) of completely curing the hard coat layer forming film and the antireflection layer forming film to form the hard coat layer and the antireflection layer.

An example of a preferable embodiment of the method of manufacturing an antireflection film according to the present invention is illustrated in FIG. 1.

(1) of FIG. 1 schematically illustrates a state in which a hard coat layer forming film 2. is provided by applying a hard coat layer forming composition including a crosslinking compound having a weight-average molecular weight equal to or greater than 600, a compound having a molecular weight smaller than 600 and having a photopolymerizable group, and a photopolymerization initiator, onto a substrate 1 in the step (1).

(2) in FIG. 1 schematically illustrates a state in which the hard coat layer forming film is semi-cured with the irradiation of ultraviolet light in the step (2).

(3) of FIG. 1 schematically illustrates a state in which an antireflection layer forming film is provided by applying an antireflection layer forming composition including particles 3, a binder resin forming compound 4, and a solvent onto the semi-cured hard coat layer forming film in the step (3).

(4) of FIG. 1 schematically illustrates a state in which an uneven shape is formed by causing a part of the binder resin forming compound to permeate the hard coat layer forming film to cause the particles 3 to protrude from a surface of the antireflection layer forming film which is opposite to the interface of the antireflection layer forming film with the hard coat layer forming film in the step (4).

(5) of FIG. 1 schematically illustrates a state in which a hard coat layer and an antireflection layer are formed by completely curing the hard coat layer forming film and the antireflection layer forming film in the step (5).

[Step (1)]

The step (1) is a step of applying a hard coat layer forming composition including a crosslinking compound having a weight-average molecular weight equal to or greater than 600, a compound having a molecular weight smaller than 600 and having a photopolymerizable group, and a photopolymerization initiator, onto a substrate to provide a hard coat layer forming film.

In the step (1), a method of applying the hard coat layer forming composition onto the substrate is not particularly limited, and a well-known method can be used. Examples thereof include a dip coating method, an air knife coating method, a curtain coating method, a roller coating method, a wire bar coating method, a gravure coating method, and a die coating method.

(Substrate)

The substrate is not particularly limited, as long as the substrate is a substrate having light transmittance that is generally used as a substrate of an antireflection film, but a plastic substrate or a glass substrate is preferable.

As the plastic substrate, various kinds thereof can be used. Examples thereof include a substrate containing a cellulose-based resin; cellulose acylate (triacetate cellulose, diacetyl cellulose, and acetate butyrate cellulose) and the like; a polyester resin; polyethylene terephthalate and the like, a (meth)acrylic resin, a polyurethane-based resin, polycarbonate, polystyrene, an olefin-based resin, and the like. A substrate containing cellulose acylate, polyethylene terephthalate, or a (meth)acrylic resin is preferable, a substrate containing cellulose acylate is more preferable, and a cellulose acylate film is particularly preferable. As the cellulose acylate, substrates and the like disclosed in JP2012-093723A can be preferably used.

The thickness of the plastic substrate is usually about 10 µm to 1,000 µm. However, in view of satisfactory handleability, high light transmittance, and sufficient strength, the thickness is preferably 20 µm to 200 µm and more preferably 25 µm to 100 µm. As the light transmittance of the plastic substrate, those having light transmittance of the visible light of 90% or more are preferable.

(Hard Coat Layer Forming Composition)

The hard coat layer forming composition at least includes the crosslinking compound. having a weight-average molecular weight equal to or greater than 600, the compound having a molecular weight smaller than 600 and having a photopolymerizable group, and the photopolymerization initiator.

(Crosslinking Compound Having Weight-Average Molecular Weight Equal to or Greater than 600)

The crosslinking compound having a weight-average molecular weight equal to or greater than 600 (hereinafter, also referred to as a "crosslinking compound (A)") included in the hard coat layer forming composition will be described.

Since the weight-average molecular weight of the crosslinking compound (A) is equal to or greater than 600, a free volume is great and a density is low, and accordingly, even in a case where the hard coat layer forming film is cured to some extent in the step (2) which will be described later, it is possible to cause the binder resin forming compound in the antireflection layer forming film to sufficiently permeate the hard coat layer forming film in the step (4) which will be described later. Therefore, it is thought that it is possible to lower the position of the surface of the antireflection layer forming film which is opposite to the interface of the antireflection layer forming film with the hard coat layer forming film so as to get close to the substrate, and it is possible to cause the particles to protrude from the surface to form the uneven shape.

In addition, since the weight-average molecular weight of the crosslinking compound (A) is equal to or greater than 600, the crosslinking compound (A) is not dissolved in the antireflection layer forming film, even in a case where the antireflection layer forming film is provided in the step (3) which will be described later. Accordingly, it is thought that it is possible to lower the position of the surface of the antireflection layer forming film which is opposite to the interface of the antireflection layer forming film with the hard coat layer forming film side so as to get close to the substrate in the step (4) which will be described later.

Further, since the crosslinking compound (A) is completely cured in the step (5) which will be described later, the crosslinking compounds (A) or the crosslinking compound (A) and the surrounding component are sufficiently crosslinked to each other, and therefore, it is thought that it is possible to apply scratch resistance to the antireflection The weight-average molecular weight of the crosslinking compound (A) is equal to or greater than 600, preferably equal to or greater than 1,000, and more preferably equal to or greater than 2,000. Since the weight-average molecular weight of the crosslinking compound (A) is equal to or greater than 600, permeability of the binder resin forming compound to the hard coat layer forming film is improved. In addition, in view of the scratch resistance, the weight-average molecular weight of the crosslinking compound (A) is preferably equal to or smaller than 500,000, more preferably equal to or smaller than 100,000, and even more preferably equal to or smaller than 50,000.

The weight-average molecular weight is a value shown in terms of polystyrene, and measured under the following conditions by gel permeation chromatography (GPC) and Corona CAD detection using the following device and column, and tetrahydrofuran (THF) as a solvent.
[Device Name] LC-20AD manufactured by Shimadzu Corporation+Corona CAD detector manufactured by ESA Biosciences.
[Column] Two items of TOSOH TSKgel GMHHR-H (7.8 mm×30 cm) and GMHHR-M (7.8 mm×30 cm) are linked to be used.
[Column temperature] 40° C.
[Sample concentration] 0.01 mass %
[Flow rate] 1.0 ml/min
[Calibration Curve] A calibration curve with 8 samples of TSK standard polystyrene manufactured by TOSOH Corporation Mw (weight-average molecular weight)=1,090,000 to 495 is used.

As the crosslinking group included in the crosslinking compound (A), a (meth)acryloyl group, an epoxy group, and an oxetanyl group are preferable, a (meth)acryloyl group and an epoxy group are more preferable, and a (meth)acryloyl group is most preferable.

A crosslinking group equivalent of the crosslinking group included in the crosslinking compound (A) represented by Expression (1) is preferably equal to or greater than 200. In addition, the crosslinking group equivalent is preferably equal to or smaller than 20,000, more preferably equal to or smaller than 2,000, even more preferably equal to or smaller than 800, and most preferably equal to or smaller than 400.

the crosslinking group equivalent of the crosslinking compound (A)=the weight-average molecular weight of the crosslinking compound (A)/a number of crosslinking groups included in 1 molecule of the crosslinking compound (A)   Expression (1)

Since the crosslinking group equivalent is equal to or greater than 200, the binder resin forming compound in the antireflection layer forming film easily permeates the hard coat layer forming film. In addition, since the crosslinking group equivalent is equal to or smaller than 20,000, the crosslinking compounds (A) or the crosslinking compound (A) and the surrounding component are sufficiently crosslinked to each other, in a case where the complete curing has performed in the step (5) which will be described later. Therefore, it is thought that it is possible to apply scratch resistance to the antireflection film.

It is particularly preferable that the crosslinking compound (A) includes a (meth)acryloyl group as the crosslinking group and the crosslinking group equivalent represented by Expression (1) is in the range described above.

The crosslinking compound (A) is preferably a urethane resin, a (meth)acrylic resin, or an epoxy resin, and more preferably a urethane resin.

In view of permeability of the binder resin forming compound in the antireflection layer forming composition to the hard coat layer forming film, a content of the crosslinking compound (A) in the hard coat layer forming composition is preferably 5% to 91% by mass, more preferably 14% to 81% by mass, and even more preferably 68% to 71% by mass, with respect to the total solid content in the hard coat layer forming composition. The solid content indicates components other than the solvent.

(Compound Having Molecular Weight Smaller than 600 and Including Photopolymerizable Group)

The compound having a molecular weight smaller than 600 and having a photopolymerizable group, which is included in the hard coat layer forming composition (hereinafter, may be referred to as a "compound having a photopolymerizable group") will be described.

Examples of the photopolymerizable group included in the compound having a photopolymerizable group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Specific examples of the compound having a photopolymerizable group include (meth)acrylic acid diesters of alkylene glycol such as neopentyl glycol acrylate, 1,6-hexanediol (meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis{4-(acryloxy.diethoxy)phenyl} propane, and 2-2-bis{4-(acryloxy.polypropoxy)phenyl} propane.

Epoxy (meth)acrylates, urethane (meth)acrylates, and polyester (meth)acrylates are also preferably used as a compound having a photopolymerizable group.

Among these, esters of polyhydric alcohol and (meth)acrylic acid are preferable as the compound having a photopolymerizable group. More preferably, it contains a compound having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri (meth)acrylate, EO-modified phosphate tri (meth)acrylate, trimethylol ethane tri(meth)acrylate, ditrimethylolpropane tetra(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

The compound having a photopolymerizable group may be used singly or in combination of two or more kinds thereof. The polymerization of these compounds having a photopolymerizable group can be performed by irradiation with light under the presence of a photopolymerization initiator. The light may be active energy rays, and specifically, X rays, electron beams, ultraviolet rays, visible light, or infrared rays, and ultraviolet rays are preferable.

In view of scratch resistance, a content of the compound having a photopolymerizable group in the hard coat layer forming composition is preferably 5% to 91% by mass, more preferably 14% to 81% by mass, and even more preferably 68% to 71% by mass, with respect to the total solid content in the hard coat layer forming composition.

In view of satisfying both the permeability of the binder resin forming compound in the antireflection layer forming composition to the hard coat layer forming film, and excellent scratch resistance, a mass ratio of the crosslinking compound (A) to the compound having a photopolymerizable group (crosslinking compound (A)/compound having a photopolymerizable group (B) in the hard coat layer forming composition is preferably 5/95 to 95/5, more preferably 15/85 to 85/15, and even more preferably 25/75 to 75/25.

The molecular weight of the compound having a photopolymerizable group is obtained from the structural formula thereof.

(Polymerization Initiator)

A polymerization initiator included in the hard coat layer forming composition will be described.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable embodiments, commercially available products and the like of the photopolymerization initiator are disclosed in paragraphs [0133] to [0151] of JP2009-098658A and can be appropriately used in the present invention in the in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful in the present invention.

The content of the polymerization initiator in the hard coat layer forming composition is an amount sufficient for polymerizing the photopolymerizable compound included in the hard coat layer forming composition, and is preferably 0.5% to 8% by mass and more preferably 1% to 5% by mass with respect to the total solid content in the hard coat layer forming composition, in order to set the starting point not to excessively increase.

The hard coat layer forming composition may include components other than the components described above. Examples of the other components include a solvent, an antistatic agent, an antiglare agent, a leveling agent, and a sensitizing agent. As the solvent, the same solvent included in the antireflection layer forming composition which will be described later is used. It is preferable to use a solvent having excellent solubility to the crosslinking compound having a weight-average molecular weight equal to or greater than 600 and the compound having a photopolymerizable group, and in a case where polarities of the two components are different from each other, it is more preferable that solvents having high solubility to the respective components are used in combination.

A concentration of solid contents of the hard coat layer forming composition is preferably 10% by mass to 80% by mass and more preferably 20% by mass to 60% by mass.

In a case where the hard coat layer forming composition includes a solvent, it is preferable to include a step of drying the solvent between the step (1) and the step (2). The drying temperature is preferably equal to or higher than 30° C., more preferably equal to or higher than 40° C., and even more preferably equal to or higher than 50° C. In addition, the drying temperature is preferably equal to or lower than 150° C., and more preferably equal to or lower than 100° C. The drying time is preferably equal to or longer than 30 seconds and more preferably equal to or longer than 60 seconds.

[Step (2)]

The step (2) is a step of semi-curing the hard coat layer forming film provided in the step (1).

Here, the "semi-curing" indicates that a total of reaction rates of the crosslinking group and the photopolymerizable group on the surface of the hard coat layer forming film which is opposite to the substrate is equal to or greater than 15% and smaller than 70%. The reaction rate is shown as a total of consumption rates of the crosslinking group and the photopolymerizable group due to light irradiation (Expression (2)).

$$\text{Reaction Rate} = 1 - \{\text{total amount of peak surface area of carbon-carbon unsaturated double bond after light irradiation and peak surface area of carbon-oxygen bond}\}/\{\text{total amount of peak surface area of carbon-carbon unsaturated double bond before light irradiation and peak surface area of carbon-oxygen bond}\} \times 100\% \quad (2)$$

The peak surface area is obtained by performing a reflection measurement of the hard coat layer forming film before and after the semi-curing once under the following conditions using NICOLET 6700 Fourier Transform Infrared Spectroscopy (FT-IR) manufactured by Thermo electron corporation.

[Measurement range] 400 to 4,000 cm$^{-1}$
[Number of times of scanning] 32 times
[Crystal] Ge
[Incidence angle] 45°

The peak surface area, of the carbon-carbon unsaturated double bond is obtained from the peak of 808 cm$^{-1}$ and the peak surface area of the carbon-oxygen bond is obtained from the peak of 1,000 to 900 cm$^{-1}$, respectively.

By setting the reaction rate to be equal to or greater than 15%, the binder resin forming compound in the antireflection layer forming film easily permeates the hard coat layer forming film. This is may be because the compound having a photopolymerizable group in the hard coat layer forming film hardly reversely permeates the antireflection layer forming film. In addition, by setting the reaction rate to be smaller than 70%, an excessive increase in density of the hard coat layer forming film is prevented, and accordingly, the binder resin forming compound easily permeates the hard coat layer forming film.

In the step (2), it is preferable to perform the semi-curing by irradiating the hard coat layer forming film provided in the step (1) with light. The light may be active energy rays, and specifically, X rays, electron beams, ultraviolet rays, visible light, or infrared rays, and ultraviolet rays are preferable. An irradiation amount of the light irradiation is preferably 0.1 to 100 mJ/cm$^2$, more preferably 1 to 50 mJ/cm$^2$, and even more preferably 3 to 30 mJ/cm$^2$.

The step (2) is preferably performed in the environment of an oxygen concentration of 0.01% to 10% by volume (more preferably 0.05% to 5% by volume and more preferably 0.1% to 2.5% by volume).

[Step (3)]

The step (3) is a step of applying an antireflection layer forming composition including particles, a binder resin forming compound, and a solvent onto the hard coat layer forming film semi-cured in the step (2), to provide an antireflection layer forming film.

(Antireflection Layer Forming Composition)

The antireflection layer forming composition at least includes particles, a binder resin forming compound, and a solvent.

(Particles)

The particles included in the antireflection layer forming composition will be described.

Examples of the particles include a metal oxide particle, resin particle, and an organic-inorganic hybrid particle having a core of a metal oxide particle and a shell of a resin. In view of excellent film hardness, the metal oxide particle is preferable.

Examples of the metal oxide particle include a silica particle, a titania particle, a zirconia particle, and an antimony pentoxide particle. Since the refractive index is close to many binders, haze is hardly generated and the moth eye structure is easily formed. Therefore, a silica particle is preferable.

Examples of the resin particle include a polymethyl methacrylate particle, a polystyrene particle, and a melamine particle.

In view of obtaining a moth eye structure in which the uneven shape of the surface of the antireflection layer is desirable, an average primary particle diameter of the particles is preferably 50 to 380 nm, more preferably 100 to 320 nm, and even more preferably 120 to 250 nm.

Only one kind of the particles may be used singly, or two or more kinds of particles having different average primary particle diameters may be used.

An indentation hardness of the particles is preferably 400 MPa, more preferably equal to or greater than 450 MPa, and even more preferably equal to or greater than 550 MPa. The indentation hardness of the particles is preferably equal to or greater than 400 MPa, because durability with respect to pressure in a thickness direction of the moth eye structure increases. In addition, the indentation hardness of the particles is preferably equal to or smaller than 1,000 MPa, in order to prevent embrittling and cracking.

The indentation hardness of the particles can be measured by a nanoindenter or the like. As specific measuring means, the measurement can be performed by arranging the particles in a direction orthogonal to the surface of a substrate harder than the particles (a glass plate or a quartz plate) so that the plural particles are not overlapped, and press with a diamond indenter. In this case, it is preferable that the particles are fixed with a resin or the like so as to not move. Here, in a case of performing the fixing with a resin or the like, the fixing is performed by controlling some particles to be exposed. In addition, the indentation position is preferably specified by a Tribo indenter.

Also in this aspect, a sample is manufactured by arranging the particles on the substrate and bonding and fixing the particles using a small amount of a curable resin so as to not affect a measurement value, and the indentation hardness of the particles of this sample is obtained by using a measurement method with an indenter.

The average primary particle diameter of the particles refers to the volume cumulative 50% particle diameter. A scanning electron microscope (SEM) can be used to measure the particle diameter. A powder particle (in a case of a dispersion liquid, ones obtained by volatilizing a solvent by drying) is observed at the appropriate magnification (about 5000 times) by scanning electron microscope (SEM) observe, the diameter of each of 100 primary particles is measured, the volume thereof is calculated, and the cumulative 50% particle diameter can be taken as the average primary particle diameter. In a case where the particle is not spherical, the average value of the long diameter and the short diameter is regarded as the diameter of the primary particle. In a case where the particle contained in the antireflection film is measured, it is calculated by observing the antireflection film from the front surface side by SEM in the same manner as described above. In this case, for easier observation, carbon vapor deposition, an etching treatment, and the like may be suitably applied to the sample.

A shape of the particle is most preferably a spherical shape, but may be a shape other than a spherical shape such as an amorphous shape.

The silica particle may be crystalline or amorphous.

As the particle, a surface-treated inorganic fine particle is preferably used for improving the dispersibility in the coating liquid, improving the film hardness, and preventing aggregation. Specific examples and preferable examples of the surface treatment method are the same as those described in [0119] to [0147] of JP2007-298974A.

Particularly, in view of providing the binding properties to the binder resin forming compound and improving the film hardness, it is preferable that the surface of the particle is surface-modified with a compound having a functional group having reactivity with an unsaturated double bond and the particle surface, and an unsaturated double bond is applied to the particle surface. As the compound used in the surface modification, a silane coupling agent having a polymerizable functional group can be appropriately used. Examples of the polymerizable functional group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Since the amount of hydroxyl groups on the surface is moderately large and the particle is hard, the particle is particularly preferably a calcined silica particle.

The calcined silica particle can be manufactured by a well-known technique of hydrolyzing and condensing a hydrolysable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenylrichlorosilane, dimethyldichlorosilane, diphenyldichlorosilane, methyl vinyl dichlorosilane, trimethylchlorosilane, and methyl diphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3(2-aminoethylamino) propyltrimethoxysilane, phenyltrimethoxysilane, phenyltriethoxysilane, dimethyl dimethoxysilane, dimethyl diethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyl triacetoxysilane, phenyl triacetoxysilane, dimethyl diacetoxysilane, diphenyl diacetoxysilane, and trimethylacetoxysilane; and a silanol compound such as dimethylsilanediol, diphenylsilanediol, and trimethylsilanol. Among the exemplary silane compounds, an alkoxysilane compound is particularly preferable, since alkoxysilane compound can be obtained more easily and halogen atoms as impurities in the obtained calcined silica particle are not included. As a preferred embodiment of the calcined silica particle according to the present invention, it is preferable that the content of halogen atoms is substantially 0%, and halogen atoms are not detected.

The calcining temperature is not particularly limited, but is preferably 800° C. to 1,300° C. and more preferably 1,000° C. to 1,200° C., The content of the particles in the antireflection layer forming composition is preferably 10% to 95% by mass, more preferably 35% to 90% by mass, and even more preferably 65% to 85% by mass with respect to the total solid content in the antireflection layer forming composition.

It is preferable that only one kind of the monodispersed silica fine particle having an average primary particle diameter of 50 to 380 nm and having a Cv value (dispersion degree) of less than 5% is contained, since the height of the unevenness of the surface of the antireflection layer becomes homogeneous and the reflectivity is further decreased. The CV value is usually measured using a laser diffraction type particle diameter determination device, but other particle diameter measuring methods may be used, or particle size distribution can be calculated and obtained from the surface SEM image of the antireflection layer of the present invention by image analysis. The CV value is more preferably less than 4%.

Binder Resin Forming Compound

The binder resin forming compound included in the antireflection layer forming composition will be described.

The binder resin forming compound is preferably a compound which forms a binder resin, in a case where the antireflection layer forming film is completely cured in the step (5) which will be described later.

As the binder resin forming compound, a compound having a radical reactive group is preferable. Examples of the radical reactive group include addition polymerizable unsaturated bond (for example, a (meth)acryloyl group, a (meth)acrylamide group, a (meth)acrylonitrile group, an allyl group, a vinyl group, a styrene structure, a vinyl ether structure, and an acetylene structure), —SH, —PH, SiH, —GeH, and a disulfide structure, The binder resin forming compound may be used singly or in combination of two or more compounds in combination.

Particularly, at least two kinds of the compounds are used as the binder resin forming compound, at least one kind thereof is a compound permeating the substrate in the step (4), and is preferably a compound having at least one radical reactive group or reactive groups other than the at least one radical reactive group.

Specific examples of the compound having a radical reactive group include (meth)acrylic acid diesters of alkylene glycol, (meth)acrylic acid diesters of polyoxyalkylene glycol, (meth)acrylic acid diesters of polyhydric alcohol, (meth)acrylic acid diesters of an ethylene oxide or propylene oxide adduct, epoxy (meth)acrylates, urethane (meth)acrylates, and polyester (meth)acrylates.

As the binder resin forming compound, the following curable compounds (a1-1) to (a1-3) are used, and among these, it is preferable that two or more kinds thereof are used in combination, and it is more preferable that all of three kinds are used in combination.

Curable compound (a1-1): Compound having a molecular weight equal to or greater than 400 and having a radical reactive group Curable compound (a1-2): Silane coupling agent having a radical reactive group Curable compound (a1-3): Compound having a molecular weight smaller than 400 and having at least one radical reactive group or reactive groups other than the at least one radical reactive group, or compound having a molecular weight smaller than 300 and volatilizes in a case of heating The molecular weight of the curable compound is obtained from a structural formula, in a case of definitively obtaining from the structural formula of the curable compound, and is set as a weight-average molecular weight measured using gel permeation chromatography, in a case of not definitively obtaining from the structural formula due to the distribution such as the polymer compound.

The weight-average molecular weight of the curable compound is a value measured in the following conditions by the gel permeation chromatography (GPC).

[Solvent] Tetrahydrofuran
[Device Name] TOSOH HLC-8220GPC
[Column] Three items of TOSOH TSKgel Super HZM-H (4.6 mm×1.5 cm) are linked to be used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation weight-average molecular weight (Mw)=2,800,000 to 1,050 is used.

The curable compound (a1-1) is a compound having a molecular weight equal to or greater than 400 and having a radical reactive group.

The curable compound (a1-1) is a compound which hardly permeates the substrate.

The molecular weight of the curable compound (a1-1) is preferably 400 to 100,000 and more preferably 1,000 to 50,000.

A functional group equivalent of the curable compound (a1-1) shown as (molecular weight/radical reactive group amount) is preferably equal to or smaller than 1,000, more preferably equal to or smaller than 500, and even more preferably equal to or smaller than 200.

Specific examples of the curable compound (a1-1) include esterified products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 (manufactured by Nippon Kayaku Co., Ltd.), NK ESTER A-TMPT, A-TMMT, A-TMM3, A-TMM3L, AND A-9550 (manufactured by Shin Nakamura Chemical Co., Ltd.), VISCOAT #3PA, VISCOAT #400, VISCOAT #36095D, VISCOAT #1000, VISCOAT #1080, and VISCOAT #802 (manufactured by Osaka Organic Chemical Industry Ltd.), and dendrimer type polyfunctional acrylate such as Sirius-501 and SUBARU-501 (manufactured by Osaka Organic Chemical Industry Ltd.).

The curable compound (a1-2) is a silane coupling agent having a radical reactive group.

The molecular weight of the curable compound (a1-2l is preferably 100 to 5,000 and more preferably 200 to 2,000.

The curable compound (a1-2) is preferably a compound which hardly permeates the substrate.

A functional group equivalent of the curable compound (a1-2) shown (molecular weight/radical reactive group amount) is preferably equal to or smaller than 1,000, more preferably equal to or smaller than 800, and even more preferably equal to or smaller than 400.

Specific examples of the curable compound (a1-2) include 3-(meth)acryloxypropyltrimethoxysilane, 3-(meth)acryloxypropylmethyldimethoxysilane, 3-(meth)acryloxypropyldimethylmethoxysilane, 3-(meth)acryloxypropylmethyldiethoxysilane, 3-(meth)acryloxypropyl triethoxysilane, 2-(meth)acryloxyethyltrimethoxysilane, 2-(meth)acryloxyethyltriethoxysilane, 4-(meth)acryloxybutyltrimethoxysilane, and 4-(meth)acryloxybutyltriethoxysilane, Specifically, KBM-503 and KBM-5103 (manufactured by Shin-Etsu Chemical Co., Ltd.) or silane coupling agents X-12-

1048, X-12-1049, and X-12-1050 (manufactured by Shin-Etsu Chemical Co., Ltd.) disclosed in JP2014-123091A can be used.

The curable compound (a1-3) is a compound having a molecular weight smaller than 400 and having at least one radical reactive group or reactive groups other than the at least one radical reactive group.

The curable compound (a1-3) is preferably a compound which hardly permeates the substrate at 25° C., and easily permeates the substrate in a case of heating.

As the reactive groups other than the radical reactive group included in the curable compound (a1-3), a group which reacts with the compound constituting the substrate (functional layer, in a case where the substrate includes a functional layer such as a hard coat layer or the like), is preferable, and examples thereof include an epoxy group, an amino group, a boronic acid group, a boronic acid ester group, an oxiranyl group, an oxetanyl group, a hydroxyl group, a carboxyl group, and an isocyanate group.

The molecular weight of the curable compound (a1-3) is preferably equal to or greater than 100 and smaller than 400 and more preferably 200 to 300.

The curable compound (a1-3) preferably includes two or more reactive groups other than the radical reactive group.

Specific examples of the curable compound (a1-3) include CELLOXIDE 2021P, CELLOXIDE 2081, EPOLEAD GT-301, EPOLEAD GT-401, and EHPE 3150CE (all manufactured by Daicel Corporation), OXT-121, OXT-221, OX-SQ, and PNOX-1009 (all manufactured by Toagosei Co., Ltd.), KBM-303, KBM-402, KBM-403, KBE-402, KBE-403, and KBM-4803 (all manufactured by Shin-Etsu Chemical Co., Ltd.).

The curable compound (a1-3) may be a compound which volatilizes in a case of heating. In this case, the molecular weight is preferably equal to or greater than 50 and smaller than 300, so that the compound hardly volatilizes at room temperature and volatilizes in a case of heating. The molecular weight is more preferably equal to or greater than 100 and smaller than 200.

Specific examples thereof include BLEMMER GMR, BLEMMER GML, and 2-hydroxyethyl methacrylate (HEMA).

A content of the binder resin forming compound is preferably 50% by mass to 80% by mass and more preferably 55% by mass to 65% by mass with respect to the total solid content in the antireflection layer forming composition.

In a case where the binder resin forming compound includes all of the curable compounds (a1-1) to (a1-3), the content of the curable compound (a1-1) in the binder resin forming compound is preferably 1.0% by mass to 30% by mass and more preferably 5% by mass to 20% by mass. In addition, the content of the curable compound (a1-2) is preferably 1.0% by mass to 60% by mass and more preferably 1.0% by mass to 30% by mass. Further, the content of the curable compound (a1-3) is preferably 5.0% by mass to 60% by mass and more preferably 20% by mass to 50% by mass.

(Solvent)

The solvent included in the antireflection layer forming composition will be described.

In view of improving the dispersibility, it is preferable to select a solvent having a polarity close to that of the particle. Specifically, for example, in a case where the particle is a metal oxide particle, an alcohol-based solvent is preferable, and examples thereof include methanol, ethanol, 2-propanol, 1-propanol, and butanol. For example, in a case where the particle is a metal resin particle subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

In view of ease of the evenly coating, the concentration of solid contents of the antireflection layer forming composition is preferably 3% by mass to 80% by mass and more preferably 5% by mass to 60% by mass.

The antireflection layer forming composition may include a component other than the components described above. Examples of the other component include a polymerization initiator, a metal-complex compound, a dispersing agent of particles, a leveling agent, and an antifouling agent. As the polymerization initiator, the same photopolymerization initiator in the hard coat layer forming composition is used. Regarding the dispersing agent of particles, the leveling agent, and the metal-complex compound, the description disclosed in a paragraph [0068] of WO2015/152308 can also be referred in the present invention.

In the step (3), the method of applying the antireflection layer forming composition is the same as the method of applying the hard coat layer forming composition of the step (1) described above.

It is preferable to include a step of drying the solvent between the step (3) and the step (4). The drying temperature is not particularly limited, as long as it is a temperature at which the binder resin forming compound does not permeate the hard coat layer forming film, and is preferably equal to or lower than 40° C. and more preferably equal to or lower than 30° C. It is preferable to perform the drying at a temperature equal to or lower than 40° C., because the solvent in the antireflection layer forming film volatilizes so that the particles hardly approach each other, thereby contributing to a decrease in reflectivity.

The method of manufacturing an antireflection film of the present invention may include a step (A1) of irradiating the antireflection layer forming film with light (preferably, ultraviolet rays), after the step (3) and before the step (4).

The condition of the step (A1) is preferably a condition, in which a curing rate obtained by the following expression, in a case where a component excluding the particles from the antireflection layer forming composition is applied to the substrate to have a thickness of 2 µm and cured, becomes 2% to 20%. Accordingly, it is possible to prevent the particles from approaching each other, by curing a part of the binder resin forming compound in the antireflection layer forming film.

$$1-\{\text{total of peak surface area of carbonyl group after light irradiation and peak surface area of polymerizable carbon-carbon unsaturated double bond}\}/\{\text{total of peak surface area of carbonyl group before light irradiation and peak surface area of polymerizable carbon-carbon unsaturated double bond}\}\times 100\%  \quad \text{Curing rate}$$

More specifically, KBr-IR measurement of the film before curing the antireflection layer forming composition (excluding particles) before the light irradiation is performed using NICOLET6700 FT-IR manufactured by Thermo electron corporation, and the peak (1660 to 1800 $cm^{-1}$) are of the carbonyl group and the peak surface area (808 $cm^{-1}$) of the polymerizable carbon-carbon unsaturated double bond is obtained. In addition, the peak surface area of the carbonyl group and the peak surface area of the polymerizable carbon-carbon unsaturated double bond are obtained from the IR measurement of one reflection after the light irradiation, and a curing rate is calculated by obtaining a change rate of the peak surface areas before and after the light irradiation.

In the step (A1), the ultraviolet rays are preferably emitted with the irradiation amount of 1 to 90 mJ/cm$^2$, more preferably emitted with the irradiation amount of 1.2 to 40 mJ/cm$^2$, and even more preferably emitted with the irradiation amount of 1.5 to 10 mJ/cm$^2$.

In the step (A1), it is preferable to emit the ultraviolet rays from the side of the substrate opposite to the side provided with the antireflection layer forming film, to cure a part of the binder resin forming compound. Accordingly, it is possible to cure particularly a region of the antireflection layer forming film on the hard coat layer side, and the uneven shape is easily formed with the particles in the subsequent step, while the particles are not moved.

The step (A1) is preferably performed in the environment of the oxygen concentration of 0.1% to 5.0% by volume, and the step (A1) is more preferably performed in the environment of the oxygen concentration of 0.5% to 1.0% by volume. By setting the oxygen concentration to be in the range described above, it is possible to cure particularly the region of the antireflection layer forming film on the hard coat layer side.

[Step (B1) and Step (B2)]

In the present invention, it is preferable to include a step (B1) of providing a layer (b) including a compound (b1) which is not compatible with the binder resin forming compound in the antireflection layer forming film, on a surface of the antireflection layer forming film opposite to the interface of the antireflection layer forming film with the hard coat layer, between the step (3) and the step (4) or between the step (4) and the step (5), and a step (B2) of removing the layer (b) after the step (B1).

The step (B1) is preferably included between the step (3) and the step (4).

The step (B2) is preferably included after the step (5).

(Layer (b))

The layer (b) includes the compound (b1) which is not compatible with the binder resin forming compound (also referred to as a "compound (b1)").

The layer (b) is preferably provided in order to cause the particles of the antireflection layer forming film not to be aggregated, and is preferably finally removed.

The expression that the compound (b1) is not compatible with the binder resin forming compound means that an insoluble material remains, in a case where 5% by mass of the compound (b1) is mixed and stirred with respect to the binder resin forming compound at 25° C.

In addition, the compound (b1) is preferably a compound which is not cured by heating. It is preferable that the compound (b1) is a compound which is not cured by heating, because a moth eye structure is easily formed with the particles, even in a case where a heating treatment is included before removing the compound (b1) in the manufacturing method of the present invention.

In a case of providing the layer (b) by the coating, as the compound (b1), a liquid oil component at 50° C. is preferable, and a silicone-based oil component, a hydrocarbon-based oil component, an ester-based oil component, natural animal and vegetable fats and oils, semisynthetic fats and oils, higher fatty acid, higher alcohol, or a fluorine-based oil component is more preferable.

[Silicone-based Oil Component]

The silicone-based oil component may be in any of a solid state, a semi-solid state, and liquid state. As the silicone-based oil component, for example, silicone oil, a silicone-based surfactant, a silicone resin, silicone wax, and a silicone-based gelling agent can be used.

Examples of silicone oil include linear or branched organopolysiloxane having a low or high viscosity such as dimethylpolysiloxane (for example, KF96 series manufactured by Shin-Etsu Chemical Co., Ltd.), tristrimethylsiloxymethylsilane, caprylyl methicone, phenyl trimethicone, tetrakistrimethylsiloxysilane, methylphenylpolysiloxane, methylhexyl polysiloxane, methyl hydrogen polysiloxane, or a dimethyl siloxane methyl phenyl siloxane copolymer; cyclic organopolysiloxane such as octamethylcyclotetrasiloxane, decamethylcyclopentasiloxane, dodecamethylcyclohexasiloxane, Tetramethyltetrahydrogen cyclotetrasiloxane, or tetramethyltetraphenyl cyclotetrasiloxane; amino-modified organopolysiloxane; pyrrolidone-modified organopolysiloxane; pyrrolidone carboxylic acid-modified organopolysiloxane; silicone rubber such as gum-like dimethylpolysiloxane having a high polymerization degree, gum-like amino-modified organopolysiloxane, or a gum-like dimethylsiloxane.methylphenylsiloxane copolymer; silicone gum or a cyclic organopolysiloxane solution rubber; a cyclic siloxane solution of trimethylsiloxysilicate or trimethylsiloxysilicate (for example, KF-7312J or the like manufactured by Shin-Etsu Chemical Co., Ltd.), higher alkoxy-modified silicone such as stearoxy silicone; higher fatty acid-modified silicone; alkyl-modified silicone; long chain alkyl-modified silicone; amino acid-modified silicone; fluorine-modified silicone; and a dissolved material of a silicone resin.

Examples of the silicone-based surfactant include a linear or branched polyoxyethylene-modified organopolysiloxane, a linear or branched polyoxyethylene polyoxypropylene-modified organopolysiloxane, a linear or branched polyoxyethylene.alkyl-comodified organopolysiloxane, a linear or branched polyoxyethylene polyoxypropylene.alkyl-comodified organopolysiloxane, a linear or branched polyglycerin-modified organopolysiloxane, and a linear or branched polyglycerol.alkyl-comodified organopolysiloxane (specific examples thereof include a silicone-based emulsifying agent manufactured by Shin-Etsu Chemical Co., Ltd.; KF-6011, 6043, 6028, 6038, 6100, 6104, and 6105). In addition, polyoxyethylene-modified partially crosslinked organopolysiloxane or polyglycerin-modified partially crosslinked polydiorganosiloxane may be used in a state of coexistence with other oil components (for example, KSG series manufactured by Shin-Etsu Chemical Co., Ltd.; KSG-210, 710, 310, 320, 330, 340, 320Z, 350Z, 810, 820, 830, 840, 820Z, and 850Z).

Examples of the silicone resin include an acrylic silicone resin such as an acrylic/silicone graft copolymer or an acrylic/silicone block copolymer (specific examples thereof include a cyclic organopolysiloxane solution of an acrylic/silicone graft copolymer; KP-545 manufactured by Shin-Etsu Chemical Co., Ltd.). In addition, an acrylic silicone resin including at least one kind selected from a pyrrolidone portion, a long chain alkyl portion, a polyoxyalkylene portion, a fluoroalkyl portion, or an anionic portion such as carboxylic acid, in a molecule can also be used. This silicone resin is preferably a reticulated silicone compound formed of at least one kind of a resin constituting of a $R^8_3SiO_{0.5}$ unit and a $SiO_2$ unit, a resin constituting of a $R^8_3SiO_{0.5}$ unit, a $R^8_2SiO$ unit, and a $SiO_2$ unit, a resin constituting of a $R^8_3SiO_{0.5}$ unit and a $R^8SiO_{1.5}$ unit, a resin constituting of a $R^8_3SiO_{0.5}$ unit, a $R^8_2SiO$ unit, and a $R^8SiO_{1.5}$ unit, and a resin constituting of a $R^8_3SiO_{0.5}$ unit, a $R^8_2SiO$ unit, a $R^8SiO_{1.5}$ unit, or a $SiO_2$ unit. $R^8$ in the formulae is a substituted or unsubstituted monovalent hydrocarbon group having 1 to 30 carbon atoms. In addition, a reticulated silicone compound including at least one kind selected from a pyrrolidone portion, a long chain alkyl portion, a polyoxyalkylene portion, a polyglycerin portion, a fluoroalkyl portion, or an amino portion, in a molecule can also be used.

Examples of silicone wax include acrylic silicone wax formed of an acrylic/silicone graft copolymer and an acrylic/silicone block copolymer (specific examples thereof include a cyclic organopolysiloxane solution of an acrylic/silicone graft copolymer manufactured by Shin-Etsu Chemical Co., Ltd.; KP-561P and 562P). In addition, acrylic silicone wax including at least one kind selected from a pyrrolidone portion, a long chain alkyl portion, a polyoxyalkylene portion, a fluoroalkyl portion, or an anionic portion such as carboxylic acid, in a molecule can also be used. This silicone wax is preferably polylactone-modified polysiloxane obtained by bonding polylactone which is a ring-opened polymer of five or more membered lactone compound. In addition, this silicone wax is silicone-modified olefin wax obtained by additive reaction of olefin wax having an unsaturated group formed of α-olefin and diene, and organohydrogen polysiloxane having one or more SiH bonds in one molecule. As the α-olefin, α-olefin having 2 to 12 carbon atoms such as ethylene, propylene, 1-butene, 1-hexene, or 4-methyl 1-pentene is preferable, and as the diene, butadiene, isoprene, 1,4-hexadiene, vinyl norbornene, ethylidene norbornene, or dicyclopentadiene is preferable. As the organohydrogen polysiloxane having SiH bonds, a linear component or a siloxane branched component can be used.

Examples of the silicone-based gelling agent include a gel mixture including a gelling component of non-modified or modified partially crosslinked organo polysiloxane such as non-modified partially crosslinked organopolysiloxane, alkyl-modified partially crosslinked organo polysiloxane, or silicone branched alkyl-modified partially crosslinked. organopolysiloxane, and various oil components such as cyclopentasiloxane, dimethicone, mineral oil, isododecane, trioctanoin, or squalane. In the gel mixture, the gelling component and the oil component are included in a coexistence state. Examples of the gel mixture include KSG series (product name), particularly, KSG-15, 16, 41, 42, 43, 44, 042Z, and 045Z (all product names) manufactured by Shin-Etsu Chemical Co., Ltd.

Examples of the hydrocarbon-based oil component include liquid paraffin, light liquid isoparaffin, heavy liquid isoparaffin, vaseline, n-paraffin, isoparaffin, isododecane, isohexadecane, polyisobutylene, hydrogenated polyisobutylene, polybutene, ozokerite, ceresin, microcrystalline wax, paraffin wax, polyethylene wax, polyethylene polypropylene wax, squalane, squalene, pristane, polyisoprene, and wax.

Examples of the ester-based oil component include hexyldecyl octanoate, cetyl octanoate, isopropyl myristate, isopropyl palmitate, butyl stearate, hexyl laurate, myristyl myristate, oleyl oleate, decyl oleate, octyldodecyl myristate, hexyldecyl dimethyl octanoate, cetyl lactate, myristyl lactate, diethyl phthalate, dibutyl phthalate, lanolin acetate, ethylene glycol monostearate, propylene glycol monostearate, propylene glycol dioleate, glyceryl monostearate, glyceryl monooleate, glyceryl tri-2-ethythexanoate, trimethylolpropane tri 2-ethylhexanoate, ditrimethylol propane triethylhexanoate, (isostearic acid/sebacic acid) ditrimethylolpropane, trimethylolpropane trioctanoate, trimethylolpropane triisostearate, diisopropyl adipate, diisobutyl adipate, diisobutyl adipate, 2-hexyldecyl adipate, di-2-heptylundecyl adipate, diisostearyl malate, hydrogenated monoisostearic acid castor oil, N-alkyl glycol monoisostearate, octyldodecyl isostearate, isopropyl isostearate, isocetyl isostearate, ethylene glycol di-2-ethylhexanoate, cetyl 2-ethylhexanoate, pentaerythritol tetra-2-ethythexanoate, octyldodecyl gum ester, ethyl oleate, octyldodecyl oleate, neopentyl glycol dicaprate, triethyl citrate, 2-ethylhexyl succinate, dioctyl succinate, isocetyl stearate, diisopropyl sebacate, di-2-ethylhexyl sebacate, diethyl sebacate, dioctyl sebacate, dibutyl octyl sebacate, cetyl palmitate, octyldodecyl palmitate, octyl palmitate, 2-ethylhexyl palmitate, 2-hexyldecyl palmitate, 2-heptylundecyl palmitate, cholesteryl 12-hydroxystearate, dipentaerythritol fatty acid ester, 2-hexyldecyl myristate, ethyl laurate, N-lauroyl-L-glutamic acid 2-octyldodecyl ester, N-lauroyl-L-glutamic acid di (cholesteryl/behenyl/octyldodecyl), N-lauroyl-L-glutamic acid di (cholesteryl/octyldodecyl), N-lauroyl-L-glutamic acid di (phytosteryl/behenyl/octyldodecyl), N-lauroyl-L-glutamic acid di (phytosteryl/octyldodecyl), N-lauroyl sarcosine isopropyl, diisostearyl malate, neopentyl glycol dioctanoate, isodecyl neopentanoate, isotridecyl neopentanoate, isostearyl neopentanoate, isononyl isononanoate, isotridecyl isononanoate, octyl isononanoate, isotridecyl isononanoate, diethyl pentane diene dineopentanoate, methyl pentanediol dineopentanoate, octyldodecyl neodecanoate, 2-butyl-2-ethyl-1, 3-propanediol dioctanoate, pentaerythrityl tetraoctanoate, hydrogenated rosin pentaerythrityl, pentaerythrityl triethylhexanoate, (hydroxystearic acid/stearic acid/rosin acid) dipentaerythritol, polyglyceryl tetraisostearate, polyglyceryl-10 nonaisostearate, deca (erucic acid/isostearic acid/ricinoleic acid) Polyglyceryl-8, (hexyldecanoic acid/sebacic acid) dialyceryl oligoester, glycol distearate (ethylene glycol distearate), diisopropyl dimer dilinoleate, diisostearyl dimer dilinoleate, di(isostearyl/phytosteryl) dimer dilinoleate, (phytosteryl/behenyl) dimer dilinoleate, (phytosteryl/isostearyl/cetyl/stearyl/behenyl) dimer dilinoleate, dimer dilinoleyl dimer dilinoleate, dimer dilinoleyl diisostearate, dimer dilinoleyl hydrogenated rosin condensate, dimer dilinoleate hydrogenated castor oil, hydroxyalkyl dimer linoleyl ether, glyceryl triisooctanoate, glyceryl triisostearate, glyceryl trimyristate, glyceryl triisopalmitate, glyceryl trioctanoate, glyceryl trioleate, glyceryl diisostearate, glyceryl tri(caprylate/caprate), glyceryl tri(caprylate/caprate/myristate/stearate), hydrogenated rosin triglyceride (hydrogenated ester gum), rosin triglyceride (ester gum), glyceryl behenate eicosane diacid, glyceryl di-2-heptylundecanoate, diglyceryl myristate isostearate, cholesteryl acetate, cholesteryl nonanoate, cholesteryl stearate, cholesteryl isostearate, cholesteryl oleate, cholesteryl 12-hydroxystearate, macadamia nut oil fatty acid cholesteryl, macadamia nut oil fatty acid phytosteryl, phytosteryl isostearate, soft lanolin fatty acid cholesteryl, hard lanolin fatty acid cholesteryl, long chain branched fatty acid cholesteryl, long chain α-hydroxy fatty acid cholesteryl, octyldodecyl ricinoleate, octyldodecyl lanolin fatty acid, octyldodecyl erucate, isostearic acid hydrogenated castor oil, avocado oil fatty acid ethyl, and lanolin fatty acid isopropyl.

Examples of the natural animal and vegetable fats and oils and semisynthetic fats and oils include avocado oil, linseed oil, almond oil, barbecue, eno oil, olive oil, cocoa butter, kapok wax, kaya oil, carnauba wax, cod liver oil, candelilla wax, beef tallow, beef tallow fat, beef bone fat, hardened beef tallow, kyunin oil, spermaceti, hardened oil, wheat germ oil, sesame oil, rice germ oil, rice bran oil, sugarcane wax, sasanqua oil, safflower oil, rhea butter, cinnamon oil, cinnamon oil, jojobarou, olive squalane, shellac wax, turtle oil, soybean oil, tea seed oil, camellia oil, evening primrose oil, corn oil, lard, rapeseed oil, japanese tung oil, nucca wax, germ oil, horse fat, persic oil, palm oil, palm kernel oil, castor oil, hydrogenated. castor oil, castor oil fatty acid methyl ester, sunflower oil, grape oil, bayberry wax, jojoba oil, hydrogenated jojoba ester, macadamia nut oil, beeswax, mink oil, cottonseed oil, cotton wax, wolfberry, wolfberry kernel oil, montan wax, coconut oil, hydrogenated coconut oil, triacid oil fatty acid glyceride, tamba, peanut oil, lanolin, liquid lanolin, reduced lanolin, lanolin alcohol, hard lanolin, lanolin acetate, lanolin fatty acid isopropyl, poe (polyoxyethylene) lanolin alcohol ether, poe lanolin alcohol acetate, lanolin fatty acid polyethylene glycol, poe hydrogenated lanolin alcohol ether, and egg yolk oil.

Examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (epa), docosahexaenoic acid (dha), isostearic acid, and 12-hydroxystearic acid.

Examples of higher alcohol include lauryl alcohol, myristyl alcohol, palmityl alcohol, stearyl alcohol, behenyl alcohol, hexadecyl alcohol, oleyl alcohol, isostearyl alcohol, hexyl dodecanol, octyl dodecanol, cetostearyl alcohol, 2-decyltetradecinol, cholesterol, sitosterol, phytosterol, lanosterol, poe cholesterol ether, monostearyl glycerin ether (batyl alcohol), and monooleyl glyceryl ether (celkyl alcohol).

Examples of the fluorine-based oil component include perfluoropolyether, perfluorodecalin, and perfluorooctane.

In view of preventing the aggregation of the particles forming the moth eye structure and reducing cloudiness of the antireflection film, the compound (b1) is preferably liquid at 50° C. and more preferably liquid at 25° C. In addition, a boiling point of at least one kind of the compound (b1) is preferably equal to or higher than 110° C. The boiling point is preferably equal to or higher than 110° C., because the compound is hardly volatilized at room temperature and can be present as the layer (b) until the curing of the antireflection layer forming film is completed.

From the viewpoint described above, a kinematic viscosity at 25° C. of the compound (b1) having a boiling point equal to or higher than 110° C. is preferably 0.1 mm$^2$/s to 100,000 mm$^2$/s, more preferably 0.1 mm$^2$/s, to 10,000 mm$^2$/s, and most preferably 0.1 mm$^2$/s to 100 mm$^2$/s.

The compound (b1) may be used singly or in combination of two or more kinds thereof.

The content of the compound (b1) in the layer (b) is preferably 50% to 100% by mass, more preferably 70% to 100% by mass, and even more preferably 90% to 100% by mass with respect to the total solid content of the layer (b).

In the step (B2), the removing method of the layer (b) is not particularly limited, and a method of performing the washing with a solvent which does not dissolve the substrate and dissolves the compound (b1), or a method of volatilizing the compound (b1) by heating at a temperature higher than the boiling point of the compound (b1) is preferable.

The removing method of the layer (b) is not particularly limited, and a method of using a solvent which does not dissolve the substrate and the antireflection layer and dissolves the compound (b1) (for example, the method of performing the washing with the solvent described above), a method of volatilizing the compound (b1) by heating at a temperature higher than the boiling point of the compound (b1), or a method of dissolving the compound (b1) with an alkali solution is preferable.

The solvent which does not dissolve the substrate and the antireflection layer and dissolves the compound (b1) is not particularly limited, and in a case where the substrate is triacetylcellulose, an alcohol solvent such as methanol, ethanol, 2-propanol, 1-propanol, n-butanol, isobutanol, diacetone alcohol, or methoxypropanol, a ketone-based solvent such as methyl isobutyl ketone or methyl butyl ketone, an aromatic solvent such as toluene or xylene, cyclohexane, and propylene glycol monomethyl ether acetate are preferable. These solvents may be used by mixing a plurality of kinds thereof.

A heating temperature in a case of volatilizing the compound (b1) is preferably a temperature which is lower than a glass transition temperature of the substrate and higher than the boiling point of the compound (b1), and specifically, preferably 60° C. to 180° C. and more preferably 80° C. to 130° C.

As the solution in a case of performing the dissolving with the alkali solution, an aqueous solution of sodium hydroxide or potassium hydroxide is preferably used.

[Step (4)]

The step (4) is a step of causing a part of the binder resin forming compound to permeate the hard coat layer forming film to cause the particles to protrude from the surface of the antireflection layer forming film which is opposite to an interface of the antireflection layer forming film with the hard coat layer forming film to form an uneven shape.

In the step (4), a part of the binder resin forming compound in the antireflection layer forming film permeates the hard coat layer forming film so as to lower the position of the surface of the antireflection layer forming film which is opposite to the interface of the antireflection layer forming film with the hard coat layer forming film so as to get close to the substrate, and the particles protrude from the surface to form the uneven shape.

As a method of causing a part of the binder resin forming compound in the antireflection layer forming film to permeate the hard coat layer forming film, a method of heating a laminate formed of the substrate, the hard coat layer forming film, and the antireflection layer forming film is preferable. By the heating, a part of the binder resin forming compound can effectively permeate the hard coat layer forming film. The temperature in heating is preferably smaller than the glass transition temperature of the substrate. Specifically, the temperature is preferably 60° C. to 180° C. and more preferably 80° C. to 130° C.

[Step (5)]

The step (5) is a step of completely curing the hard coat layer forming film and the antireflection layer forming film to form a hard coat layer and an antireflection layer.

Here, the expression "completely curing" means that a reaction rate of the reactive group of the antireflection film on the antireflection layer side is equal to or greater than 70%. A calculating method of the reaction rate is the same as the calculating method of the reaction rate in a case of the "semi-curing". In Expression (2) for obtaining the reaction rate, the "total amount of the peak surface area of the carbon-carbon unsaturated double bond before the light irradiation and the peak surface area of the carbon-oxygen bond" is obtained from the hard coat layer forming film before the step (2) (that is, before the semi-curing). In addition, the "total amount of the peak surface area of the carbon-carbon unsaturated double bond after the light irradiation and the peak surface area of the carbon-oxygen bond" is obtained from the antireflection film after the step (5) (that is, after the complete curing).

In the step (5), the complete curing is preferably performed by irradiating the hard coat layer forming film and the antireflection layer forming film after the step (4) with light. The light may be active energy rays, and specifically, X rays, electron beams, ultraviolet rays, visible light, or infrared rays, and ultraviolet rays are preferable. The irradiation amount of the light irradiation is preferably 150 to 1,000 mJ/cm$^2$, and more preferably 200 to 800 mJ/cm$^2$.

The step (5) is preferably performed in the environment of a low oxygen concentration and the oxygen concentration is preferably equal to or smaller than 0.01% by volume.

In a case where the step (5) is completed, the antireflection film including, in the following order, the substrate, the hard coat layer and the antireflection layer having an uneven shape on the surface of the hard coat layer which is opposite to the interface of the antireflection layer with the hard coat layer.

A film thickness of the hard coat layer is preferably 0.6 to 50 μm and more preferably 5 to 20 μm.

The hardness of the hard coat layer is preferably equal to or greater than H and more preferably equal to or greater than 2H, by a pencil hardness test. In addition, in a Tabor test according to Japanese industrial Standard (JIS) K 5600-5-4 (1999), a smaller amount of abrasion of a test piece before and after the test is preferable.

The uneven shape of the antireflection layer of the antireflection film preferably has a moth eye structure.

(Moth Eye Structure)

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 380 nm, the tint of reflected light becomes small. It is preferable that the periodicity of the uneven shape of the moth eye structure is 100 nm or more, light having a wavelength of 380 nm can recognize a microstructure pattern and is excellent in antireflection properties. Whether the moth eye structure is present can be checked by observing the surface shape with a scanning electron microscope (scanning electron microscope (SEM)), an atomic force microscope (AFM) or the like, and checking whether the microstructure pattern can be formed.

Figure 2:
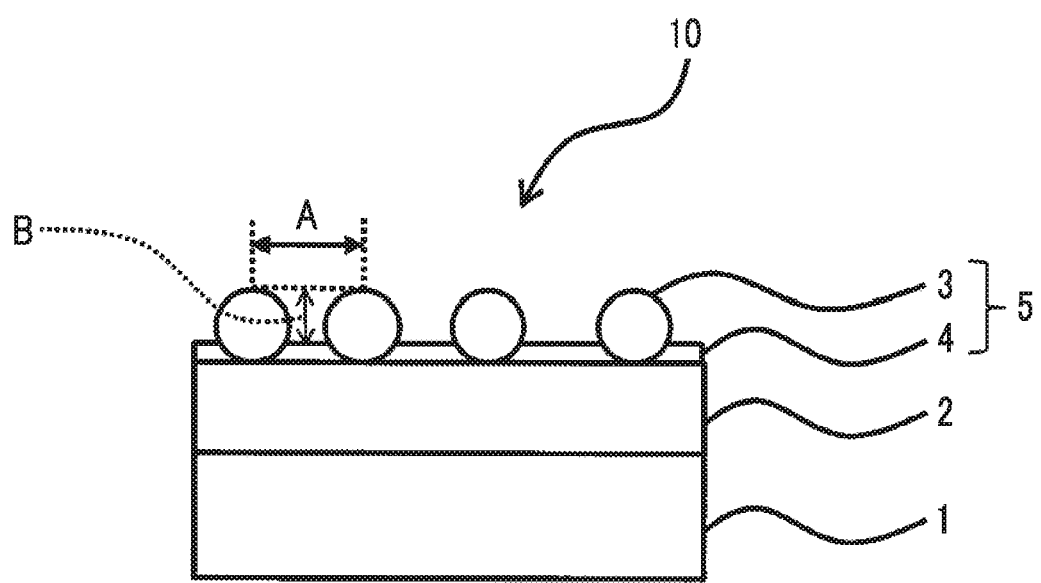
FIG. 2 is a schematic cross-sectional view illustrating an example of an antireflection film of the present invention.

An example of a preferable embodiment of an antireflection film manufactured by the manufacturing method of the present invention is illustrated in FIG. 2.

An antireflection film 10 in FIG. 2 has a substrate 1, a hard coat layer 2, and an antireflection layer 5. The antireflection layer 5 includes particles 3 and a binder resin 4, and has an uneven shape formed by the particles 3 on the surface which is opposite to the interface of the antireflection layer 5 with the hard coat layer 2 side.

In the uneven Shape the antireflection layer of the antireflection film manufactured by the manufacturing method of the present invention, it is preferable that B/A which is the ratio of a distance A between the peaks of the adjacent protrusions and a distance B between the center between the peaks of the adjacent protrusions and the recessed part is 0.5 or more. In a case where B/A is 0.5 or more, the refractive index gradient layer in which the depth of the recessed part is greater than the distance between the protrusions and the refractive index gradually changes from the air to the inside of the antireflection layer can be formed, and thus the reflectivity can be further reduced.

B/A can be controlled by the volume ratio of the binder resin and the particle in the antireflection layer after curing. Therefore, it is important to appropriately design the formulation ratio of the binder resin and the particle. In a case where the binder resin permeates the substrate in the step of preparing the moth eye structure or volatilizes, the volume ratio of the binder resin and the particle in the antireflection layer forming composition becomes different from the formulation ratio in the composition for forming the antireflection layer, and thus the matching with the substrate is appropriately set.

In order to decrease the reflectivity, it is preferable that the particle for forming the protrusions is uniformly spread at an appropriate filling rate. In view of the above, the content of the particle for forming the protrusions is preferably adjusted such that the inorganic particle is uniform over the entire antireflection layer. The filling rate can be measured as the area occupation ratio (particle occupancy ratio) of the particle located most surface side in a case of observing the particle for forming the protrusions from the normal direction of the surface by SEM or the like, and is preferably 30% to 95%, more preferably 40% to 90%, and even more preferably 50% to 85%.

Hereinafter, a measurement method of B/A which is a ratio of the distance A between the peaks of the adjacent protrusions and the distance B between the center between the peaks of the adjacent protrusions and the recessed part will be described more specifically.

The B/A can be measured by the SEM observation of the cross section of the antireflection film. An antireflection film sample is cut with a microtome to expose the cross section, and the SEM observation is performed at an appropriate magnification (about 5000 times). For easier observation, carbon vapor deposition, an etching treatment, and the like may be suitably applied to the sample. In a case where, a distance between the peaks of the adjacent protrusions on the interface between air and the sample is set as A, a distance between a linear line which includes the peaks of the adjacent protrusions and connects the peaks of the adjacent protrusions in the plane vertical to the surface of the substrate, and a recessed part which is a point where a perpendicular bisector thereof approaches equal to or higher than particles or the binder resin is set as B, and the length measurement is performed at 100 points, the B/A is calculated as an average value of B/A.

In the SEM image, regarding all of imaged unevenness, the distance A between peaks of the adjacent protrusions and the distance B between center between the peaks of the adjacent protrusions and the recessed part may not be accurately measured, but in this case, the length measurement may be performed by focusing on the protrusions and recessed part imaged on the front side of the SEM image.

Regarding the recessed part, it is necessary to perform the measurement at a depth which is the same as that of the particle forming the two adjacent protrusions to be measured in the SEM image. This is because that, in a case where the length measurement is performed by setting the distance to the particles imaged in the further front side as B, B may be assumed to be small.

The B/A is preferably equal to or greater than 0.6, more preferably equal to or greater than 0.7, and even more preferably equal to or greater than 0.8. In addition, the B/A is preferably equal to or smaller than 0.9, in view of strongly fixing the moth eye structure and excellent scratch resistance.

Regarding the antireflection film manufactured by the manufacturing method of the present invention, an average of the integrated reflectivity at a wavelength of 450 to 650 nm is preferably equal to or smaller than 2%, more preferably equal to or smaller than 1.5%, and even more preferably equal to or smaller than 1%.

Regarding the antireflection film manufactured by the manufacturing method of the present invention, the amount of a reflectivity change before and after performing a scratch resistance test with respect to the surface of the antireflection layer, is preferably equal to or smaller than 2.5%, more preferably equal to or smaller than 1.5%, even more preferably equal to or smaller than 1.0%, and still more preferably equal to or smaller than 0.5%.

[Antireflection Film]

The antireflection film of the present invention is an antireflection film including, in the following order:

a substrate;

a hard coat layer that includes a compound obtained by a reaction of a crosslinking compound having a weight-average molecular weight equal to or greater than 600 and a compound having a molecular weight smaller than 600 and having a photopolymerizable group; and an antireflection layer having an uneven shape on a surface of the antireflection layer which is opposite to an interface of the antireflection layer with the hard coat layer, in which a ratio B/A, which is a ratio of a distance A between peaks of adjacent protrusions of the uneven shape and a distance B between a recessed part of the uneven shape and a center between the peaks of the adjacent protrusions of the uneven shape, is equal to or greater than 0.5, an average of an integrated reflectivity of the antireflection film at a wavelength of 450 to 650 nm is equal to or smaller than 2%, and an amount of a reflectivity change before and after a scratch resistance test, in which a surface of the antireflection layer which is opposite to the interface of the antireflection layer with the hard coat layer is reciprocated five times using a steel wool with a load of 400 g is equal to or smaller than 2.5%.

Each constituent element of the antireflection film of the present invention is the same as the description regarding the antireflection film manufactured by the method of manufacturing an antireflection film of the present invention.

[Polarizing Plate]

The polarizing plate is a polarizing plate having a polarizer and at least one of the protective films for protecting the polarizer, and it is preferable that at least one of the at least one of the protective films is an antireflection film manufactured by the method of manufacturing the antireflection film of the present invention.

The polarizer includes an iodine-containing polarizer, a dye-based polarizer using a dichroic dye, and a polyene-based polarizer. The iodine-based polarizer and the dye-based polarizer can be generally manufactured by using a polyvinyl alcohol-based film.

[Cover Glass]

The antireflection film manufactured by the method of manufacturing an antireflection film of the present invention can also be applied to a cover glass.

[Image Display Device]

The antireflection film manufactured by the method of manufacturing an antireflection film of the present invention can also be applied to an image display device.

Examples of the image display device include a display device using a cathode ray tube (CRT), a plasma display panel (PDP), an electroluminescent display (ELD), a vacuum fluorescent display (VFD), a field emission display (FED), and a liquid crystal display device (LCD), and a liquid crystal display device is particularly preferable.

Generally, a liquid crystal display device has a liquid crystal cell and two polarizing plates disposed on both sides of the liquid crystal cell, and the liquid crystal cell carries a liquid crystal between the two electrode substrates. One optically anisotropic layer may be arranged between the liquid crystal cell and one polarizing plate, or two optically anisotropic layers may be arranged between the liquid crystal cell and both polarizing plates. As the liquid crystal cell, liquid crystal cells of various driving methods such as a Twisted Nematic (TN) mode, a Vertically Aligned (VA) mode, an Optically Compensatory Bend (OCB) mode, and an In-Plane Switching (IPS) mode can be applied.

EXAMPLES

Hereinafter, the present invention is specifically described with reference to the examples. A material, a reagent, a substance quantity, a ratio thereof, an operation, and the like provided in the following examples can be suitably changed without departing from the gist of the present invention. Accordingly, the scope of the present invention is not limited to the following specific examples.

[Synthesis of Silica Particle a-1]

67.54 kg of methyl alcohol and 26.33 kg of 28 mass % aqueous ammonia (water and catalyst) were introduced to a reactor with capacity of 200 L which is equipped with a stirrer, a dropwise adding device, and a thermometer, and the liquid temperature was adjusted to 33° C. while stirring. Meanwhile, a solution (a) prepared by dissolving 12.70 kg of tetramethoxysilane in 5.59 kg of methyl alcohol was introduced to the dropwise adding device. While the liquid temperature in the reactor was maintained to 33° C., the solution (a) was added dropwise from the dropwise adding device over 1 hour. After the dropwise addition was completed, stirring was continued while the liquid temperature was maintained to 33° C. for 1 hour, and hydrolysis and condensation of tetramethoxy silane were performed, so as to obtain a dispersion liquid containing a silica particle precursor. This dispersion liquid was air-dried under the conditions of a heating tube temperature of 175° C. and a reduced pressure degree of 200 torr (27 kPa) by using an instantaneous vacuum evaporator (CRUX SYSTEM CVX-8B model manufactured by Hosokawa Micron Corporation), so as to obtain a silica particle a-1. The average primary particle diameter was 200 nm, and the dispersion degree (CV value) of the particle diameter was 3.5%.

[Preparation of Calcined Silica Particle b-2]

5 kg of the silica particle a-1 were introduced to a crucible, calcined at 900° C. for two hours in an electric furnace, cooled, and then pulverized by using a pulverizer, to obtain the calcined silica particle before classification. Disintegration and classification were performed by using a jet pulverizing classifier (IDS-2 model manufactured by Nippon Pneumatic Mfg., Co., Ltd.) to obtain a calcined silica particle b-2. The average primary particle diameter of the obtained silica particle was 200 nm, and the dispersion degree (CV value) of the particle diameter was 3.5%.

[Preparation of Silane Coupling Agent-Treated Calcined Silica Particle c-1]

5 kg of the calcined silica particle b-2 was introduced to a Henschel mixer (FM20J model manufactured by Nippon Coke & Engineering Co., Ltd.) having a capacity of 20 L equipped with a heating jacket. A solution obtained by dissolving 45 g of 3-acryloxypropyltrimethoxysilane (KBM 5103 manufactured by Shin-Etsu Chemical Co., Ltd.) in 90 g of methyl alcohol was added dropwise to a portion in which the calcined silica particle b-2 was stirred and mixed. Thereafter, the temperature was raised to 150° C. over about one hour while mixing and stirring, and the mixture was maintained at 150° C. for 12 hours, and the heat treatment was performed. Thereafter, in the heat treatment, the attachment on the wall was scraped off while the scraping device was rotated constantly in the opposite direction to the stirring blade. If necessary, the deposits on the wall were scraped off with a spatula. After heating, cooling was performed, and disintegration and classification were performed by using a jet pulverizing classifier, so as to obtain a silane coupling agent treated calcined silica particle c-1. The average primary particle diameter was 210 nm, the dispersion degree (CV value) of the particle diameter was 3.7%. The indentation hardness was 450 MPa.

(Preparation of Hard Coat Layer Forming Composition)

Each component was introduced to a mixing tank so as to have a composition of a hard coat layer forming composition HC-1 shown in Table 1, stirred, and filtrated with a polypropylene filter having a pore size of 0.4 μm so as to obtain the hard coat layer forming composition HC-1.

Each component was mixed so as to have a composition shown in Table 1, by the same method as that of the hard coat layer forming composition HC-1, and antireflection layer forming compositions HC-2 to HC-10 having a concentration of coating solution (concentration of solid contents) of 40% to 50% by mass were prepared.

TABLE 1

Hard coat layer forming composition

| | | HC-1 | HC-2 | HC-3 | HC-4 | HC-5 | HC-6 | HC-7 | HC-8 | HC-9 | HC-10 |
|---|---|---|---|---|---|---|---|---|---|---|---|
| crosslinking compound having weight-average molecular weight equal to or greater than 600 (parts by mass) | ACRIT 8KX-012C | 5153 | | | | | | | | 6970 | 8245 |
| | UNIDIC 17-806 | | | | | | | 5153 | | | |
| | Polyethylene glycol glycidyl lauryl ether | | | | | | | | 2061 | | |
| | ACRIT 8BR-600 | | | | | 5726 | | | | | |
| | ART CURE MAP-4000 | | | | | | 5153 | | | | |
| Non-crosslinking compound having weight-average molecular weight equal to or greater than 600 (parts by mass) | ACRIT 8UA-017 | | | | 4123 | | | | | | |
| compound having molecular weight smaller than 600 and having photopolymerizable group (parts by mass) | A-TMMT | 2061 | 4123 | 2061 | | 2061 | 2061 | | 2061 | 510 | |
| | Urethane monomer | | | | 4123 | | | | | | |
| Others (parts by mass) | IRGACURE 127 | 128 | 128 | 128 | 128 | 128 | 128 | 128 | 64 | 102 | 102 |
| | VF-096 | | | | | | | | 64 | | |
| | Methyl ethyl ketone (solvent) | 1158 | 4250 | 2189 | 4250 | 586 | 1158 | 3219 | 4250 | 918 | 153 |
| Concentration of coating solution | | 50% by mass | 50% by mass | 50% by mass | 50% by mass | 50% by mass | 50% by mass | 50% by mass | 50% by mass | 40% by mass | 40% by mass |

The compounds used are provided below.

ACRIT 8KX-012C: Ethyl acetate/isopropyl alcohol solution having concentration of 40% by mass of ultraviolet ray (UV) curable urethane acrylic polymer, weight-average molecular weight (Mw) of 25,000, crosslinking group equivalent of 473, manufactured by Taisei Fine Chemical Co., Ltd.

Polyethylene glycol glycidyl lauryl ether: molecular weight of 900 to 1,000, crosslinking group equivalent of 900 to 1,000, manufactured by Tokyo Chemical Industry Co., Ltd.

ACRIT 8BR-600: Methyl isobutyl ketone (MiBK) solution having concentration of 36% by mass of UV curable urethane acrylic polymer, weight-average molecular weight of 200,000, crosslinking group equivalent of 1,700, manufactured by Taisei Fine Chemical Co., Ltd.

ART CURE MAP-4000: 40% by mass solution of propylene glycol monomethyl ether (PGME)/propylene glycol 1-monomethyl ether 2-acetate (PGMEA) of reactive acrylic polymer, weight-average molecular weight of 25,000, crosslinking group equivalent of 10,000, manufactured by Negami Chemical Industrial Co., Ltd.

UNIDIC 17-806: solution having concentration of butyl acetate of 80% by mass of a mixture of 60% by mass of urethane acrylate having a weight-average molecular weight of 600 to 10,000 and 40% by mass of an acrylate compound having molecular weight smaller than 600 such as pentaerythritol triacrylate (weight-average molecular weight of the urethane acrylate having a weight-average molecular weight of 600 to 10,000 is 1,300), crosslinking group equivalent of 230 to 300, manufactured by DIC Corporation ACRIT 8UA-017: solution having concentration of 50% by mass of ethyl acetate/isopropyl alcohol of the urethane-modified acrylic polymer, weight-average molecular weight of 40,000, no crosslinking group, manufactured by Taisei Fine Chemical Co., Ltd.

VF-096: 2,2'-azobis [N-(2-propenyl)-2-methylpropionamide]; thermal polymerization initiator IRGACURE 127: Photopolymerization initiator, manufactured by BASF Japan Ltd.

A-TMMT: pentaerythritol tetraacrylate, manufactured by Shin Nakamura Chemical Co., Ltd., molecular weight of 352

Urethane monomer: urethane monomer represented by Formula U1, molecular weight of 568

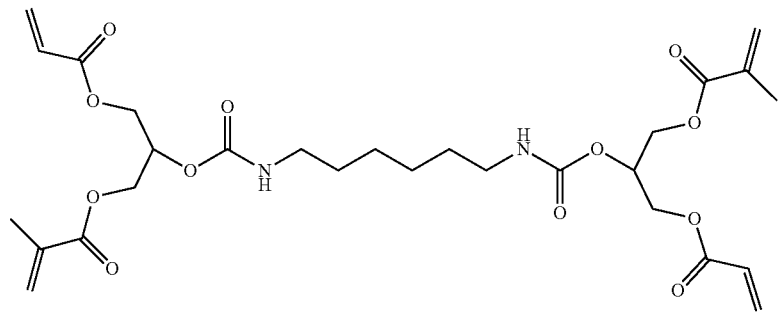

Formula U1

(Preparation of Antireflection Layer Forming Composition)

Each component was added so as to have a composition of am antireflection layer forming composition L-1 shown in Table 2, the obtained composition was introduced to a mixing tank, stirred, and filtrated with a polypropylene filter having a pore size of 5 μm so as to obtain the antireflection layer forming composition L-1.

TABLE 2

Antireflection layer forming composition

| | | L-1 |
|---|---|---|
| Binder resin forming compound (parts by mass) | VISCOAT #1080 | 13 |
| | X-12-1048 | 6 |
| | KBM-4803 | 51 |
| Particles (parts by mass) | Silane coupling agent-treated calcined silica particle c-1 (indentation hardness: 450 MPa) | 80 |
| Others parts by mass) | IRGACURE 127 | 4 |
| | Fluorine-containing polymer P | 1 |
| | Solvent    Ethanol | 382 |
| | Acetone | 382 |
| | MEK | 1147 |
| Concentration of coating solution | | 10% by mass |

X-12-1048: silane coupling agent having 1 or two or more (meth)acryloxy groups disclosed in JP2014-123091A, manufactured by Shin-Etsu Chemical Co., Ltd.
KBM-4803: Glycidoxy octyl trimethoxy silane, manufactured by Shin-Etsu Chemical Co., Ltd.
Fluorine-containing polymer P: fluorine-based polymer P-10 disclosed in JP2004-163610
VISCOAT #1080: Oligomer type acrylate of Formula B1, manufactured by Osaka Organic Chemical Industry Ltd.

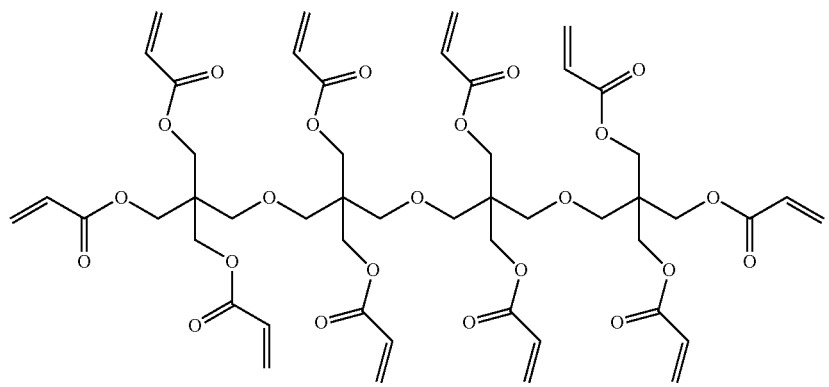

Formula B1

(Formation of Semi-Cured Hard Coat Layer Forming Film)

A cellulose triacetate film (TG40UL, manufactured by Fujifilm Corporation) was used as the substrate, and the hard coat layer forming composition HC-1 was applied onto this substrate using a gravure coater. After drying was performed at 60° C. for 1 minute, while nitrogen purging was performed so as to have an atmosphere of an oxygen concentration of 1.5% by volume, irradiation was performed with ultraviolet rays in an illuminance of 60 mW/cm² and in an irradiation amount of 15 mJ/cm² by using an air cooling metal halide lamp (manufactured by Eye Graphics Co., Ltd.) of 240 W/cm so as to perform the semi-curing, and accordingly, a hard coat layer forming film HC-1 was provided. The applied amount of the hard coat layer forming composition was set as the amount so that the film thickness becomes 7 μm, in a case where the coating and the ultraviolet ray irradiation were performed on a glass substrate by the same method. In addition, a total of the reaction rates of the crosslinking group and the photopolymerizable group after the semi-curing was set as the value shown in Table 3.

By the same method, semi-cured hard coat layer forming films HC-2 to HC-10 were prepared by using hard coat layer forming composition HC-2 to HC-10. Respectively, a total of the reaction rates of the crosslinking group and the photopolymerizable group after the semi-curing was set as the value shown in Table 3.

(Preparation of Antireflection Film A-1)

The antireflection layer forming composition L-1 was applied onto the semi-cured hard coat layer forming film HC-1 with a wet coating amount of 2.8 ml/m² using a gravure coater, dried at 30° C. for 5 minutes, heated at 120° C. for 15 minutes, so as to cause a part of the monomer which is the binder resin forming compound to permeate the hard coat layer forming film. Then, while nitrogen purging was performed so as to have an atmosphere of an oxygen concentration equal to or smaller than 0.1% by volume, irradiation was performed with ultraviolet rays in an irradiation amount of 600 mJ/cm² by using an air cooling metal halide lamp for curing, a hard coat layer and an antireflection layer were formed, and an antireflection film A-1 was manufactured. At this time, the wet coating amount was slightly adjusted to measure the particle occupancy ratio, and the film having the highest particle occupancy ratio was used as the antireflection film A-1.

(Preparation of Antireflection Film B-1)

In the same manner as in the preparation of the antireflection film A-1, the antireflection layer forming composition L-1 was applied onto the semi-cured hard coat layer forming film HC-1 and dried at 30° C. for 5 minutes.

[Step of Curing Portion of Antireflection Layer Forming Film in Advance (Pre-Exposure Step)]

Next, while nitrogen purging was performed so as to be an atmosphere in which an oxygen concentration is equal to or smaller than 1% by volume, the light irradiation was performed from the antireflection layer forming film side at an irradiation amount of 2.0 mJ by using a high-pressure mercury lamp (manufactured by Dr. Honle A G, model number: 33351 N and Part no.: LAMP-HOZ 200 D24 U 450 E), so as to cure a part of the antireflection layer forming film in advance. With respect to the measurement of the irradiation amount, HEAD SENSER PD-365 was mounted on an eye ultraviolet ray integrating accumulation illuminancemeter UV METER UVPF-A1 manufactured by Eye Graphics, Inc., and the measurement was performed in a measurement range of 0.0.

[Oil Coating Step]

An oil solution having the following composition (all silicone oils manufactured by Shin-Etsu Chemical Co., Ltd.) was applied onto the partially cured antireflection layer forming film so as to have a thickness of 600 nm using a die coater.

Composition of oil solution

KF96-10cs: 30.0 parts by mass

KF96-0.65cs: 70.0 parts by mass

[Step of Causing Portion of Monomer to Permeate Hard Coat Layer Forming Film]

The heating was performed at 120° C. for 15 minutes so as to cause a part of the monomer which is the binder resin forming compound to permeate the hard coat layer forming film HC-1. Then, while the nitrogen purging was performed so as to have the atmosphere with the oxygen concentration equal to or smaller than 0.1% by volume, the ultraviolet ray was emitted at an irradiation amount of 600 mJ$^2$ by using an air cooling metal halide lamp for the curing, and a hard coat layer and an antireflection layer were formed.

[Oil Removing Step]

After the dipping in methyl isobutyl ketone, methyl isobutyl ketone was discarded to remove the oil, and an antireflection film B-1 was manufactured.

Antireflection film B-2 to B-16 were manufactured by the same method as the manufacturing of the antireflection film B-1, except that the HC-2 to HC-10 were used instead of the hard coat layer forming film HC-1, the temperature in a case where a part of the monomer permeates the hard coat layer forming film is changed, the ultraviolet ray irradiation amount is changed to change the reaction rate of the surface of the semi-cured hard coat layer forming film, and the following post-heating treatment, as shown in Table 3.

(Post-Heating Treatment)

The sample B-11 was irradiated and cured with the ultraviolet ray at the irradiation amount of 600 mJ/cm$^2$, to form the hard coat layer and the antireflection layer, and then heating treatment was performed at 150° C. for 5 minutes, to further cure the hard coat layer.

TABLE 3

| | | Hard coat layer | | | Antireflection layer | | | | |
|---|---|---|---|---|---|---|---|---|---|
| Sample name | Substrate | Hard coat layer forming composition | Reaction rate of surface after semi-curing | Post-heating treatment (150° C. for 5 min) | Antireflection layer forming composition | Pre-exposure step Oil processing step | Step of permeation (heating time is 1.5 minutes) | Reaction rate of surface after complete curing | |
| A-1 | TD40UL | HC-1 | 45% | None | L-1 | None | 120° .C | 85% | Example |
| B-1 | TD40UL | HC-1 | 45% | None | L-1 | Performed | 120° C. | 85% | Example |
| B-2 | TD40UL | HC-2 | 45% | None | L-1 | Performed | 120° C. | 90% | Comparative Example |
| B-3 | TD40UL | HC-3 | 45% | None | L-1 | Performed | 120° C. | 85% | Comparative Example |
| B-4 | TD40UL | HC-4 | 45% | None | L-1 | Performed | 120° C. | 90% | Comparative Example |
| B-5 | TD40UL | HC-1 | 10% | None | L-1 | Performed | 120° C. | 85% | Comparative Example |
| B-6 | TD40UL | HC-1 | 90% | None | L-1 | Performed | 120° C. | 85% | Comparative Example |
| B-7 | TD40UL | HC-1 | 45% | None | L-1 | Performed | 50° C. | 85% | Comparative Example |
| B-8 | TD40UL | HC-5 | 45% | None | L-1 | Performed | 120° C. | 85% | Example |
| B-9 | TD40UL | HC-6 | 45% | None | L-1 | Performed | 120° C. | 85% | Example |
| B-10 | TD40UL | HC-7 | 45% | None | L-1 | Performed | 120° C. | 85% | Example |
| B-11 | TD40UL | HC-8 | 45% | Performed | L-1 | Performed | 120° C. | 80% | Example |
| B-12 | TD40UL | HC-9 | 45% | None | L-1 | Performed | 120° C. | 85% | Example |
| B-13 | TD40UL | HC-1 | 30% | None | L-1 | Performed | 120° C. | 85% | Example |
| B-14 | TD40UL | HC-1 | 65% | None | L-1 | Performed | 120° C. | 85% | Example |
| B-15 | TD40UL | HC-1 | 45% | None | L-1 | Performed | 90° C. | 85% | Example |
| B-16 | TD40UL | HC-10 | 45% | None | L-1 | Performed | 120° C. | 75% | Comparative Example |

(Evaluation of Antireflection Film)

The evaluations of the antireflection film were performed by the following methods. The results are shown in Table 4.

(Integrated Reflectivity)

The rear surface (substrate side) of the antireflection film was roughened with sand paper and treated with black ink, and a film sample without rear surface reflection was manufactured.

A unit IRV-471 was mounted on a spectrophotometer V-550 (manufactured by JASCO Corporation), the reflectivity was measured in a wavelength range of 450 to 650 nm, and an averaged value was set as the integrated reflectivity.

A lower integrated reflectivity is preferable, and in a case where the integrated. reflectivity is smaller than 1.0%, the film was considered to have significantly good quality with low reflection and less glare. In a case where the integrated reflectivity is 1.0% to 1.5%, the glare is slightly observed, but it is not considered as a problem. In a case where the integrated reflectivity is greater than 1.5% and equal to or smaller than 2.0%, the glare is observed, but it is at a standard level. In a case where the integrated reflectivity is greater than 200%, the glare is considered as a problem.

(Scratch Resistance)

An index of the scratch resistance was obtained by performing a rubbing test of the surface of the antireflection layer of the antireflection film using a rubbing tester under the following conditions. The rear surfaces of the sample before performing the rubbing test and the sample after performing the rubbing test were roughened with sand paper and treated with black ink, each integrated reflectivity was measured, and a difference thereof was calculated and used for the evaluation of the scratch resistance.

Evaluation environment condition: 25° C., relative humidity of 60%

Rubbing material: steel wool (manufactured by Nihon Steel Wool Co., Ltd., Grade No. 0000)

is wound around a rubbing tip portion (1 cm×1 cm) of a teste corning into contact with the sample and fixed with band movement distance (one way): 13 cm
rubbing speed: 13 cm/sec
load: 400 g/cm$^2$
tip portion contact area: 1 cm×1 cm
number of times of rubbing: reciprocating of 5 times In a case where a difference between the integrated reflectivity before and after the rubbing test is equal to or smaller than 0.5%, scratches are not substantially considered as a problem. In a case where the difference is equal to or smaller than 1.0%, scratches are slightly recognized, but they are not considered as a problem. In a case where the difference is greater than 2.5%, scratches are recognizable and considered as a problem.

(B/A of Moth Eye Structure and Half-Width of Distribution of A)

The antireflection film sample was cut with a microtome to expose the cross section, and carbon vapor deposition was performed with respect to the cross section and then, the cross section was etched for 10 minutes. The observation and imaging were performed using a scanning electron microscope (SEM) at a magnification of 5000 times at 20 fields of view. From the obtained images, the distance A between peaks of the adjacent protrusions on the interface with the air and the sample, and the distance B between center between the peaks of the adjacent protrusions and the recessed part were measured at 100 points, and an average value of B/A was calculated. The half-width of distribution of A was also calculated.

TABLE 4

| Sample name | B/A of moth eye structure | Half-width of distribution of A of moth eye structure | Integrated reflectivity | Scratch resistance (difference in integrated reflectivity before and after rubbing test) | |
|---|---|---|---|---|---|
| A-1 | 0.5 | 90 nm | 1.9% | 0.2% | Example |
| B-1 | 0.7 | 90 nm | 0.8% | 0.4% | Example |
| B-2 | 0.3 | 90 nm | 2.2% | 0.4% | Comparative Example |
| B-3 | 0.8 | 80 nm | 1.0% | 3.0% | Comparative Example |
| B-4 | 0.4 | 80 nm | 2.1% | 0.4% | Comparative Example |
| B-5 | 0.2 | 90 nm | 3.0% | 0.2% | Comparative Example |
| B-6 | 0.3 | 250 nm | 2.2% | 2.8% | Comparative Example |
| B-7 | 0.3 | 90 nm | 2.2% | 2.8% | Comparative Example |
| B-8 | 0.8 | 120 nm | 0.7% | 0.8% | Example |
| B-9 | 0.7 | 150 nm | 0.8% | 1.0% | Example |
| B-10 | 0.8 | 60 nm | 0.7% | 0.3% | Example |
| B-11 | 0.6 | 200 nm | 1.2% | 0.6% | Example |
| B-12 | 0.6 | 100 nm | 1.0% | 0.9% | Example |
| B-13 | 0.5 | 110 nm | 1.6% | 0.4% | Example |
| B-14 | 0.5 | 110 nm | 1.6% | 1.4% | Example |
| B-15 | 0.7 | 90 nm | 0.8% | 0.4% | Example |
| B-16 | 0.7 | 200 nm | 1.1% | 2.9% | Comparative Example |

According to the present invention, it is possible to provide a method of manufacturing an antireflection film having excellent antireflection performance and excellent scratch resistance, the antireflection film, a polarizing plate including the antireflection film, a cover glass, and an image display device.

The present invention has been described in detail and with reference to the specific embodiments, but it is clear for persons skilled in art that various changes or modifications can be added without departing the scope and the gist of the present invention.

This application is based on Japanese patent application (JP2016-075466) filed on Apr. 4, 2016, and the contents thereof are incorporated herein by reference.

What is claimed is:

1. An antireflection film comprising, in the following order:
   a substrate;
   a hard coat layer that comprises a compound obtained by a reaction of a crosslinking compound having a weight-average molecular weight equal to or greater than 600 and a compound having a molecular weight smaller than 600 and having a photopolymerizable group; and
   an antireflection layer having an uneven shape on a surface of the antireflection layer which is opposite to an interface of the antireflection layer with the hard coat layer,
   wherein a ratio B/A, which is a ratio of a distance A between peaks of adjacent protrusions of the uneven shape and a distance B between a recessed part of the uneven shape and a center between the peaks of the adjacent protrusions of the uneven shape, is equal to or greater than 0.5, an average of an integrated reflectivity of the antireflection film at a wavelength of 450 to 650 nm is equal to or smaller than 2%, and an amount of a reflectivity change before and after a scratch resistance test, in which a surface of the antireflection layer which is opposite to the interface of the antireflection layer with the hard coat layer is reciprocated five times using a steel wool with a load of 400 g is equal to or smaller than 2.5%.

2. A polarizing plate comprising:

a polarizer; and at least one protective film that protects the polarizer, wherein at least one of the at least one protective film is the antireflection film according to claim 1.

3. A cover glass comprising:

the antireflection film according to claim 1 as a protective film.

4. An image display' device comprising:

the antireflection film according to claim 1.

* * * * *